(12) United States Patent
Berry et al.

(10) Patent No.: US 6,728,955 B1
(45) Date of Patent: Apr. 27, 2004

(54) PROCESSING EVENTS DURING PROFILING OF AN INSTRUMENTED PROGRAM

(75) Inventors: Robert Francis Berry, Austin, TX (US); John Day Howard, Austin, TX (US); Chester Charles John, Jr., Round Rock, TX (US); Frank Eliot Levine, Austin, TX (US); Donald L. Mulvey, Round Rock, TX (US); Enio Manuel Pineda, Austin, TX (US); Robert J. Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,005

(22) Filed: Nov. 5, 1999

(51) Int. Cl.$^7$ .................................................. G06F 9/45
(52) U.S. Cl. ...................................... 717/158; 717/131
(58) Field of Search ................................. 717/158, 131

(56) References Cited

U.S. PATENT DOCUMENTS

| | | | |
|---|---|---|---|
| 4,558,413 A | 12/1985 | Schmidt et al. ............. | 364/300 |
| 5,295,230 A | 3/1994 | Kung ........................ | 395/75 |
| 5,321,834 A | 6/1994 | Weiser et al. ............... | 395/600 |
| 5,465,258 A | 11/1995 | Adams ....................... | 395/700 |
| 5,481,712 A | 1/1996 | Silver et al. ................ | 395/700 |
| 5,485,616 A | 1/1996 | Burke et al. ................ | 395/700 |
| 5,493,689 A | 2/1996 | Waclawsky et al. ........ | 395/821 |
| 5,506,955 A | 4/1996 | Chen et al. ............ | 395/183.02 |
| 5,539,907 A | 7/1996 | Srivastava et al. .......... | 395/700 |
| 5,553,235 A | 9/1996 | Chen et al. ............ | 395/182.18 |
| 5,649,085 A | 7/1997 | Lehr ........................ | 395/140 |
| 5,689,712 A | 11/1997 | Heisch ...................... | 395/705 |
| 5,732,273 A | 3/1998 | Srivastava et al. .......... | 395/704 |
| 5,737,609 A | 4/1998 | Reed et al. ................. | 395/704 |
| 5,748,878 A | 5/1998 | Rees et al. ............. | 395/183.14 |
| 5,761,477 A * | 6/1998 | Wahbe et al. ................. | 709/1 |
| 5,768,500 A | 6/1998 | Agrawal et al. ........ | 395/184.01 |
| 5,966,537 A * | 10/1999 | Ravichandran ............. | 717/158 |
| 6,016,466 A | 1/2000 | Guinther et al. ............ | 702/187 |
| 6,090,155 A * | 7/2000 | Donovan et al. | |
| 6,092,180 A * | 7/2000 | Anderson et al. ........... | 712/200 |
| 6,148,437 A * | 11/2000 | Shah et al. ................. | 717/128 |
| 6,189,141 B1 * | 2/2001 | Benitez et al. .............. | 717/153 |
| 6,223,339 B1 * | 4/2001 | Shah et al. ................. | 717/158 |
| 6,269,477 B1 * | 7/2001 | Fitzgerald et al. .......... | 717/130 |
| 6,327,699 B1 * | 12/2001 | Larus et al. ................ | 717/128 |
| 6,341,371 B1 * | 1/2002 | Tandri ....................... | 717/158 |

OTHER PUBLICATIONS

IBM Computer Dictionary, 1994, pp. 729–730.*
"Shade: A Fast Instruction—Set Simulator for Execution Profiling" Bob Cinelill et al, ACM pp. 128–136, May 1994.*
"IBM Research Report DAISY Dynamic Compilation for 100% Architectural Compatibility", K. Ebcioglu et al. IBM Research Division pp. 1–82, Aug. 1996.*
"Professional Tools User's Sourc profilier users Guide", Microsoft visual CH, version 1.0, pp. 1–72, 1993.*
"Turbo profiler 2.0" user's Guide, Borland corporation pp. 1–226, 1991.*
"Trace–directed program restructuring for AIX executables", R.R. Heisch, pp. 595–603, IBM J. Res Develop vol. 38, No. 5, Sep. 1994.*
"An Execution Profiler for modular programs", S. Graham et al, Software Practice and Experience, vol. 13, 671–685, Mar. 1983.*
"Using profile Information to assist classic code optimizations", Pohva P. Chang et al, Software Practice and Experienc, vol. 21, 1301–1321, Dec. 1991.*
"Interprocedural optimization Eliminating unnecessary recompilation", M.Burke et al, ACM Transactions on Programming Lang VIS, pp. 367–399, No. 3, Jul. 1993.*
International Business Machines Corporation; Technical Disclosure Bulletin vol 38, No 11, Nov. 1995; Implementation of High Performance Subtype Object Migration.
International Business Machines Corporation; Technical Disclosure Bulletin vol 21, No 11, Apr. 1979; Method For Correlating Graphical Data On An Interactive Display.
Morrisett et al.; Abstract Models of Memory Management; Jun. 1995; pp. 66–77.
Reilly, M; Presentation Tools for Performance Visualization: the M31 Instrumentation Experience; Jan. 1990; pp. 307–313.
Rich, SH et al.; Model–based Reasoning in Diagnositc Expert Systems for Chemical Process Plants; 1987; pp. 111–122.
Three Form Editing; No. 30363; Jul. 1989.
A Technique for Sharing Data Among Elements of a Hierarchic Document; No. 28983; May 1988.

* cited by examiner

Primary Examiner—Todd Ingberg
(74) Attorney, Agent, or Firm—Duke W. Yee; Leslie A. Van Leeuwen; Stephen R. Tkacs

(57) ABSTRACT

A user may specify a vector of metrics to be used while profiling a program. The vector of metrics may optionally be thread-relative. In response to a notification of an occurrence of the current event, a thread-relative elapsed metric is computed by: determining a current thread; retrieving a stored reference metric for the preceding event of the current thread; obtaining a current reference metric; and computing the thread-relative elapsed metric as a difference between the current reference metric and the stored reference metric. In order to prevent the generation of redundant metric information, the information associated with the vector of metrics maybe placed into the trace records in several different space-saving formats.

30 Claims, 20 Drawing Sheets

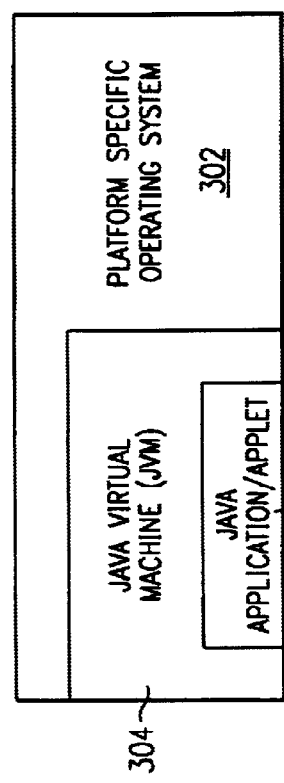
FIG. 4
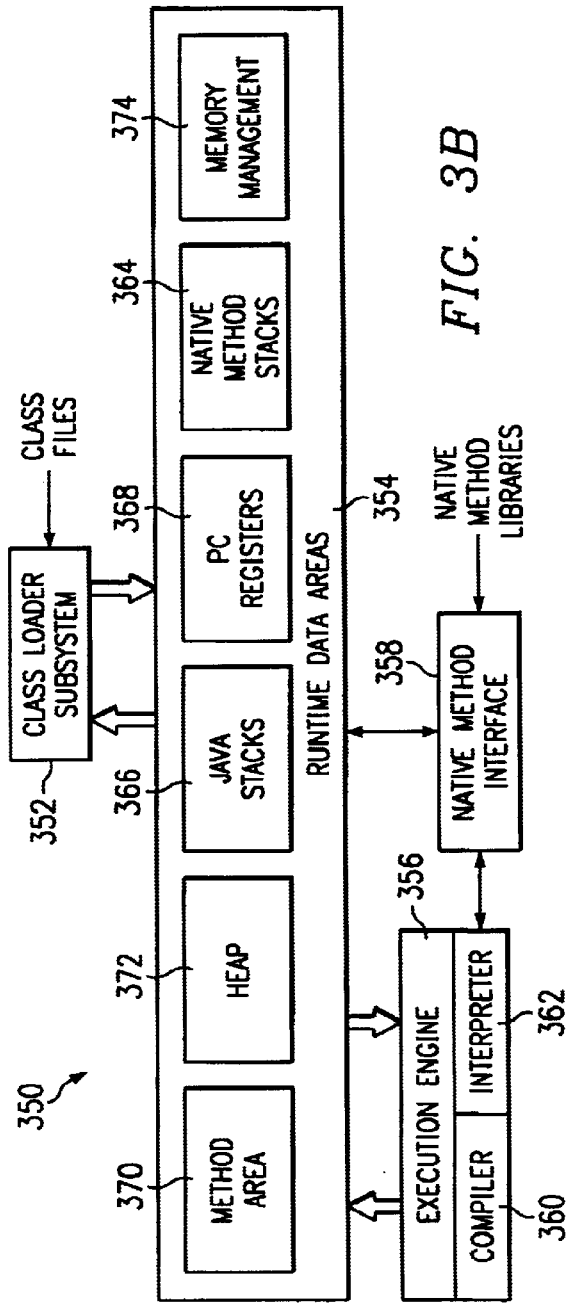
FIG. 3A
FIG. 3B

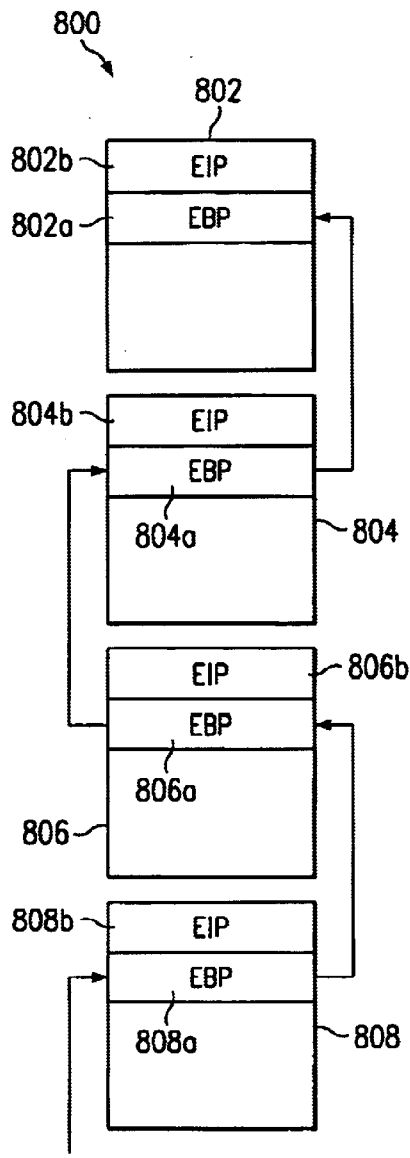
POINTER TO TOP OF
CURRENT STACK FRAME FOR
INTERRUPTED THREAD
FIG. 8
| TIMESTAMP | EVENT | CALL STACK AFTER EVENT |
|---|---|---|
| 0 | ENTER C | C |
| 1 | ENTER A | CA |
| 2 | ENTER B | CAB |
| 3 | EXIT FROM B | CA |
| 4 | ENTER B | CAB |
| 5 | ENTER B | CABB |
| 6 | EXIT FROM B | CAB |
| 7 | EXIT FROM B | CA |
| 8 | EXIT FROM A | C |
| 9 | ENTER B | CB |
| 10 | ENTER A | CBA |
| 11 | ENTER B | CBAB |
| 12 | ENTER A | CBABA |
| 13 | EXIT FROM A | CBAB |
| 14 | EXIT FROM B | CBA |
| 15 | ENTER X | CBAX |
| 16 | EXIT FROM X | CBA |
| 17 | EXIT FROM A | CB |
| 18 | EXIT FROM B | C |
| 19 | EXIT FROM C | |
FIG. 10A
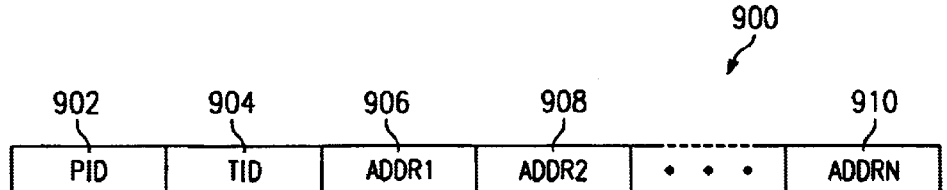
FIG. 9

| SAMPLE | CALL STACK AT SAMPLE |
|---|---|
| 1 | C |
| 2 | CAB |
| 3 | CAB |
| 4 | CAB |
| 5 | C |
| 6 | CBA |
| 7 | CBABA |
| 8 | CBA |
| 9 | CBA |
| 10 | C |
FIG. 10B
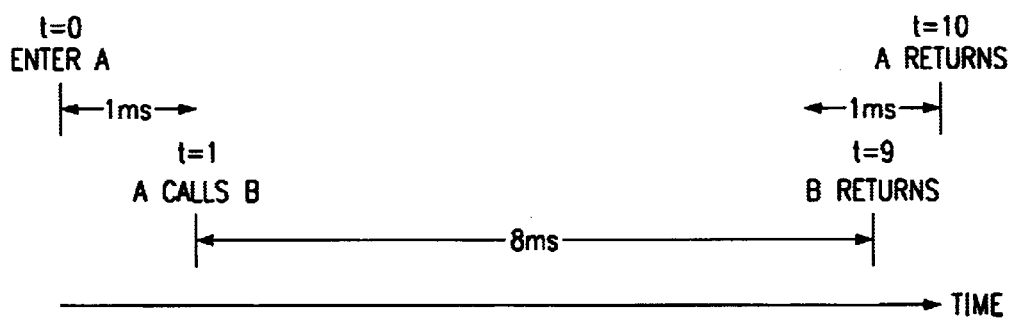
FIG. 10C
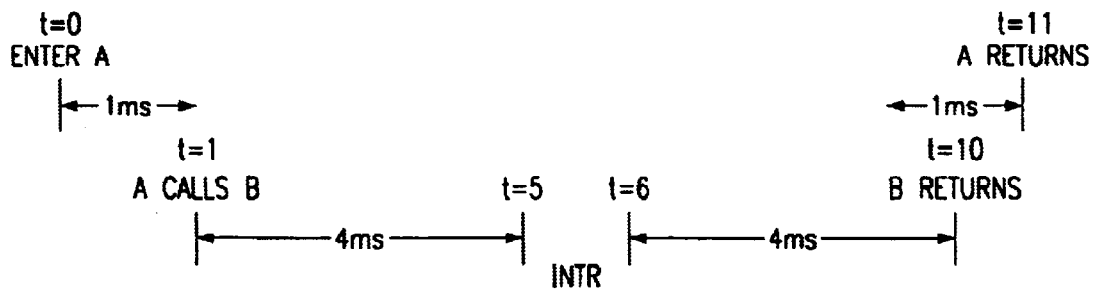
FIG. 10D

| 1230 | 1232 | 1234 | 1236 | 1238 | 1240 |
|------|------|------|------|------|------|
| LEVEL | RL | CALLS | BASE | CUM | INDENT |
| 0 | 1 | 1 | 0 | 19 | pt_pidtid |
| 1 | 1 | 1 | 3 | 19 | -C |
| 2 | 1 | 1 | 3 | 7 | --A |
| 3 | 1 | 2 | 3 | 4 | ---B |
| 4 | 2 | 1 | 1 | 1 | ----B |
| 2 | 1 | 1 | 2 | 9 | --B |
| 3 | 1 | 1 | 3 | 7 | ---A |
| 4 | 2 | 1 | 2 | 3 | ----B |
| 5 | 2 | 1 | 1 | 1 | -----A |
| 4 | 1 | 1 | 1 | 1 | ----X |

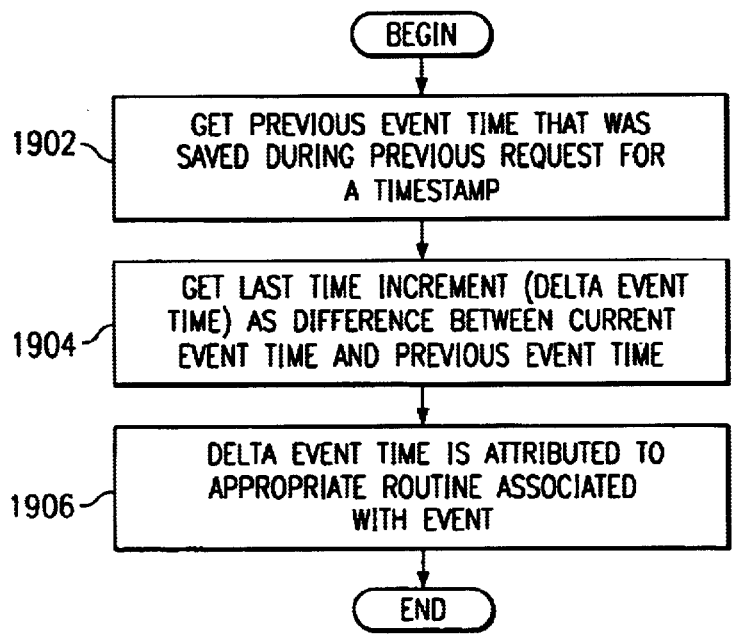
FIG. 15
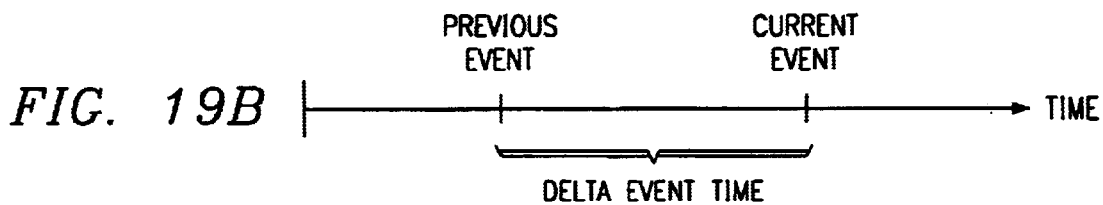
FIG. 19A
FIG. 19B

ArcFlow OUTPUT
   BASE - TIME/INSTRUCTIONS DIRECTLY IN FUNCTION
   CUM - TIME/INSTRUCTIONS DIRECTLY AND INDIRECTLY IN FUNCTION ArcFlow INVARIENTS:
1) Sum(Parent(Calls)) = Self(Calls)
2) Sum(Parent(Base)) = Self(Base)
3) Sum(Parent(Cum)) = Self(Cum)
4) Sum(Child(Cum)) = Self(Cum) - Self(Base)

| SOURCE | CALLS | BASE | CUM | FUNCTION |
|---|---|---|---|---|
| SELF | 1 | 0 | 19 | [0] pt_pidtid |
| CHILD | 1 | 3 | 19 | C |
| PARENT | 1 | 3 | 19 | pt_pidtid |
| SELF | 1 | 3 | 19 | [1] C |
| CHILD | 1 | 2 | 9 | B |
| CHILD | 1 | 3 | 7 | A |
| PARENT | 1 | 3 | 7 | C |
| PARENT | 1 | 3 | 7 | B |
| rPARENT | 1 | 1 | 1 | B |
| SELF | 3 | 7 | 14 [2] 15 | A |
| CHILD | 3 | 5 | 7 | B |
| CHILD | 1 | 1 | 1 | X |
| PARENT | 2 | 3 | 4 | A |
| rPARENT | 1 | 2 | 3 | A |
| PARENT | 1 | 2 | 9 | C |
| SELF | 5 | 8 | 13 [3] 17 | B |
| CHILD | 1 | 3 | 7 | A |
| rCHILD | 1 | 1 | 1 | A |
| CHILD | 1 | 1 | 1 | B |
| PARENT | 1 | 1 | 1 | A |
| SELF | 1 | 1 | 1 | [4] X |

*FIG. 16*

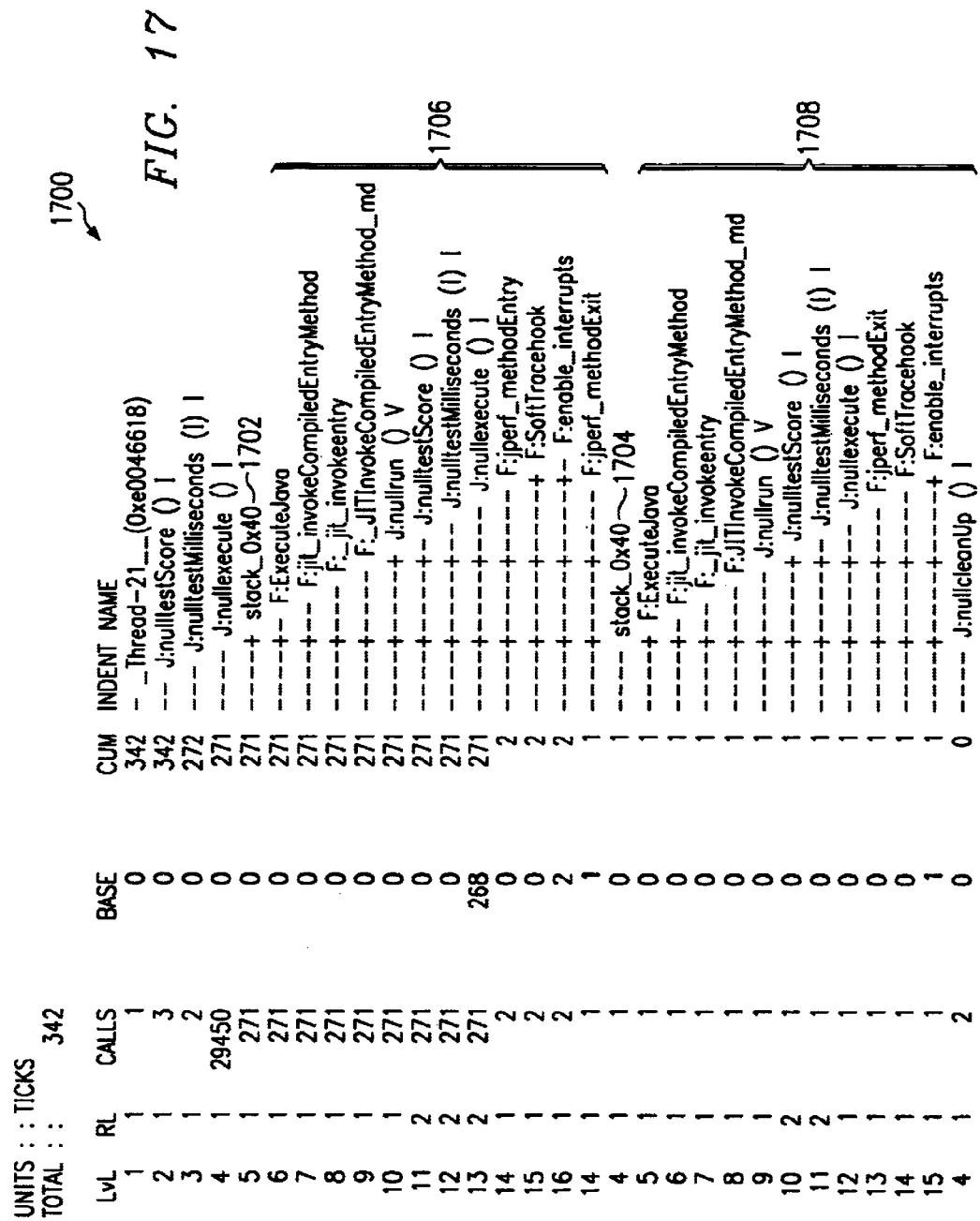

| MAJOR CODE | MINOR CODE | DATA ITEM 1 | DATA ITEM 2 | DATA ITEM 3 | DATA ITEM 4 | DATA ITEM 5 | DESCRIPTION |
|---|---|---|---|---|---|---|---|
| 0x4 | LEVEL + 0x1 | DEPTH | N/A | N/A | N/A | | BEGIN INTERRUPT AT LEVEL |
| 0x4 | LEVEL + 0x80000001 | DEPTH | N/A | N/A | N/A | | END INTERRUPT AT LEVEL |
| 0x10 | 0xab | SYSTEM TID | JAVA TID | IS SYSTEM THREAD (BOOLEAN) | N/A | | THREAD CREATED WITHOUT A NAME WHILE TRACE ACTIVE |
| 0x10 | 0xac | SYSTEM TID | N/A | N/A | N/A | | IDENTIFIES THE IDLE THREAD |
| 0x10 | 0xad | SYSTEM TID | N/A | N/A | N/A | | IDENTIFIES THE GARBAGE COLLECTION THREAD |
| 0x10 | 0xae | SYSTEM TID | JAVA TID | THREAD NAME | N/A | | THREAD CREATED WITH A NAME WHILE TRACE ACTIVE |
| 0x30 | 0x10 | OBJECT ID | METHOD BLOCK ADDRESS | N/A | N/A | | METHOD INVOCATION (INTERPRETED) |

| | | | FROM FIG. 18A | | | |
|---|---|---|---|---|---|---|
| 0x30 | 0x10 + 0x80000000 | OBJECT ID | METHOD BLOCK ADDRESS | N/A | N/A | METHOD EXIT (INTERPRETED) |
| 0x40 | 0x7fffffff | NUMBER (n) OF STACK UNWINDS AT TIMER INTERRUPT | pc1-PROGRAM COUNTER OF INTERRUPTED ROUTINE | pc2-CALLER OF INTERRUPTED ROUTINE | pcn-1 OF 2nd CALLER OF INTERRUPTED ROUTINE | pcn OF n-1st CALLER OF INTERRUPTED ROUTINE |
| 0x41 | 0x7fffffff | NUMBER (n) OF STACK UNWINDS AT INSTRUMENTED ROUTINE | pc1-PROGRAM COUNTER OF INSTRUMENTED ROUTINE | pc2-CALLER OF INSTRUMENTED ROUTINE | ...... | pcn OF n-1st CALLER OF INSTRUMENTED ROUTINE |
| 0x50 | 0x10 | OBJECT ID | METHOD BLOCK ADDRESS | N/A | N/A | METHOD INVOCATION (jitted) |
| 0x50 | 0x10 + 0x80000000 | OBJECT ID | METHOD BLOCK ADDRESS | N/A | N/A | METHOD EXIT (jitted) |

*FIG. 18B*

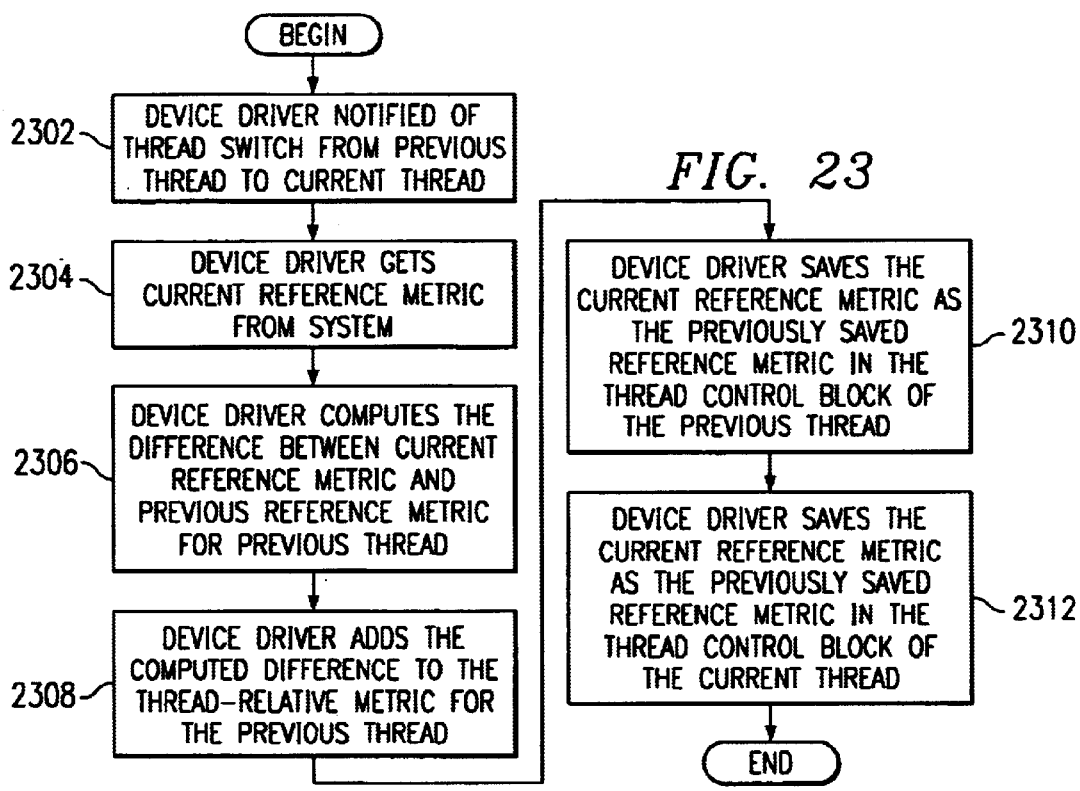
FIG. 23
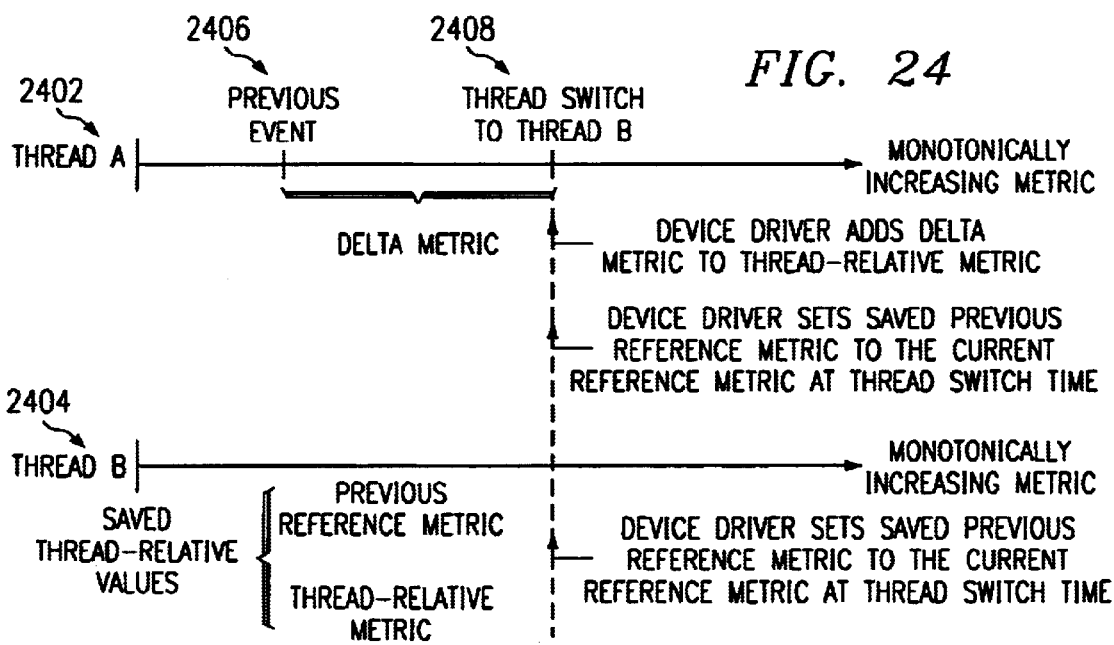
FIG. 24
2502
STRACE METRICS <PRIMARY METRIC 1> <METRIC 2> <METRIC 3> ... <METRIC N>
FIG. 25

GetMetricVector(MyPidtid, MetricsPointer, MyMetricsFlags) FIG. 27B

TRACE RECORD FORMAT

TRACE RECORD FORMAT WITH METRIC INFORMATION

TRACE RECORD FORMAT WITH METRIC INFORMATION

PROCESSING EVENTS DURING PROFILING OF AN INSTRUMENTED PROGRAM

CROSS-REFERENCE TO RELATED APPLICATIONS

This application is a continuation-in-part of the following and commonly assigned applications entitled "SYSTEM AND METHOD FOR PROVIDING TRACE INFORMATION REDUCTION", U.S. application Ser. No. 08/989,725, filed on Dec. 12, 1997, now U.S. Pat. No. 6,055,492; "A METHOD AND APPARATUS FOR STRUCTURED PROFILING OF DATA PROCESSING SYSTEMS AND APPLICATIONS", U.S. application Ser. No. 09/052,329, filed on Mar. 31, 1998, now U.S. Pat. No. 6,003,872; "METHOD AND APPARATUS FOR PROFILING PROCESSES IN A DATA PROCESSING SYSTEM", U.S. application Ser. No. 09/171,031, filed on Oct. 22, 1998, now U.S. Pat. No. 6,311,325; "PROCESS AND SYSTEM FOR MERGING TRACE DATA FOR PRIMARILY INTERPRETED METHODS", U.S. application Ser. No. 09/343,439, filed on Jun. 30, 1999, now U.S. Pat. No. 6,553,564; and "METHOD AND SYSTEM FOR MERGING EVENT-BASED DATA AND SAMPLED DATA INTO POSTPROCESSED TRACE OUTPUT", U.S. application Ser. No 09/343,438, filed on Jun. 30, 1999, now U.S. Pat. No. 6,513,155.

The present invention is related to the following applications entitled "METHOD AND SYSTEM FOR COMPENSATING FOR INSTRUMENTATION OVERHEAD IN TRACE DATA BY COMPUTING AVERAGE MINIMUM EVENT TIMES", U.S. application Ser. No. 09/393,088, filed on Sep. 9, 1999, now U.S. Pat. No. 6,349 406; "METHOD AND SYSTEM FOR COMPENSATING FOR OUTPUT OVERHEAD IN TRACE DATA USING TRACE RECORD INFORMATION", U.S. application Ser. No. 09/414,344, filed on Sep. 9, 1999; "METHOD AND SYSTEM FOR COMPENSATING FOR INSTRUMENTATION OVERHEAD IN TRACE DATA BY DETECTING MINIMUM EVENT TIMES", U.S. application Ser. No. 09/393,086, filed on Sep. 9, 1999; "METHOD AND SYSTEM FOR MAINTAINING THREAD-RELATIVE METRICS FOR TRACE DATA USING DEVICE DRIVER SUPPORT", U.S. application Ser. No. 09/393,089filed on Oct. 7, 1999; and "METHOD AND SYSTEM FOR MAINTAINING THREAD-RELATIVE TIME FOR TRACE DATA ADJUSTED FOR THREAD SWITCHES," U.S. application Ser. No. 09/393,087, filed on Sep. 9, 1999, now U.S. Pat. No. 6,539,339; all of which are assigned to the same assignee. The present application is also related to "A METHOD AND APPARATUS FOR STRUCTURED MEMORY ANALYSIS OF DATA PROCESSING SYSTEMS AND APPLICATIONS," U.S. patent application Ser. No. 09/052,331, filed Mar. 31, 1998, now U.S. Pat. No. 6,158,024, which is hereby incorporated by reference.

BACKGROUND OF THE INVENTION

1. Technical Field

The present invention relates to an improved data processing system and, in particular, to a method and apparatus for optimizing performance in a data processing system. Still more particularly, the present invention provides a method and apparatus for a software program development tool for enhancing performance of a software program through software profiling.

2. Description of Related Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time. Software performance tools also are useful in data processing systems, such as personal computer systems, which typically do not contain many, if any, built-in hardware performance tools.

One known software performance tool is a trace tool. A trace tool may use more than one technique to provide trace information that indicates execution flows for an executing program. One technique keeps track of particular sequences of instructions by logging certain events as they occur, so-called event-based profiling technique. For example, a trace tool may log every entry into, and every exit from, a module, subroutine, method, function, or system component. Alternately, a trace tool may log the requester and the amounts of memory allocated for each memory allocation request. Typically, a time-stamped record is produced for each such event of interest. Corresponding pairs of records similar to entry-exit records also are used to trace execution of arbitrary code segments, starting and completing I/O or data transmission, and for many other events of interest.

In order to improve performance of code generated by various families of computers, it is often necessary to determine where time is being spent by the processor in executing code, such efforts being commonly known in the computer processing arts as locating "hot spots." Ideally, one would like to isolate such hot spots at the instruction and/or source line of code level in order to focus attention on areas which might benefit most from improvements to the code.

For example, isolating such hot spots to the instruction level permits compiler writers to find significant areas of suboptimal code generation, at which they may focus their efforts to improve code generation efficiency. Another potential use of instruction level detail is to provide guidance to the designer of future systems. Such designers employ profiling tools to find characteristic code sequences and/or single instructions that require optimization for the available software for a given type of hardware.

Unwanted effects may be caused by the system to the information that the profiling processes are attempting to capture. Since most computer systems are interruptable, multi-tasking systems, the operating system may perform certain actions underneath the profiling processes, unbeknownst to the profiling processes. The most prevalent of these actions is a thread-switch. While a profiling process is attempting to capture information about the occurrence of an event within a particular thread, the system may perform a thread switch. Once the profiling process obtains the desired information for recording within a trace buffer, the information may have changed due to the thread switch, and the recorded information may not accurately reflect the desired information when the event occurred.

An important datum to be recorded about the occurrence of an event is its time of occurrence. However, there are situations during the analysis of a system in which it would be convenient to have a frame of reference which allows the correlation of events with multiple types of metrics in addition to time.

Therefore, it would be advantageous to provide a method and system for profiling multiple metrics, and it would be particularly advantageous to provide thread-relative metrics that are isolated from the effects caused by thread-switching so that the profiling processes may record multiple thread-relative metrics.

SUMMARY OF THE INVENTION

A method and system for maintaining and using a vector of metrics is provided. A user may specify a vector of metrics to be used while profiling a program. The vector of metrics may optionally be thread-relative. In response to a notification of an occurrence of the current event, a thread-relative elapsed metric is computed by: determining a current thread; retrieving a stored reference metric for the preceding event of the current thread; obtaining a current reference metric; and computing the thread-relative elapsed metric as a difference between the current reference metric and the stored reference metric. In order to prevent the generation of redundant metric information, the information associated with the vector of metrics may be placed into the trace records in several different space-saving formats.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3A is a block diagram depicting the relationship of software components operating within a computer system that may implement the present invention;

FIG. 3B is a block diagram depicting a Java virtual machine in accordance with a preferred embodiment of the present invention;

FIG. 4 is a block diagram depicting components used to profile processes in a data processing system;

FIG. 8 is a diagram depicting the call stack containing stack frames;

FIG. 9 is an illustration depicting a call stack sample;

FIG. 10A is a diagram depicting a program execution sequence along with the state of the call stack at each function entry/exit point;

FIG. 10B is a diagram depicting a particular timer based sampling of the execution flow depicted in FIG. 10A;

FIGS. 10C–D are time charts providing an example of the types of time for which the profiling tool accounts;

FIG. 15 is a diagram depicting a record generated using the processes of present invention;

FIG. 16 is a diagram depicting another type of report that may be produced to show the calling structure between routines shown in FIG. 12;

FIG. 17 is a table depicting a report generated from a trace file containing both event-based profiling information (method entry/exits) and sample-based profiling information (stack unwinds);

FIGS. 18A–18B are tables depicting major codes and minor codes that may be employed to instrument modules for profiling;

FIG. 19A is a flowchart depicting a summary of the manner in which elapsed time is attributed to various routines in an execution flow;

FIG. 19B is a timeline depicting demarcated time points with which the process in FIG. 19A is concerned;

FIG. 23 is a flowchart depicting a process by which the device driver maintains metric information concerning various instrumented events thread switches that may occur between thread switchesvarious instrumented events;

FIG. 24 is a set of timelines depicting some of the actions performed by the device driver with respect to a thread switch between two different threads;

FIG. 25 depicts an example of an input command for a vector of metrics is provided in accordance with a preferred embodiment of the present invention;

FIG. 27B illustrates an example of an application programming interface for retrieving a vector of metrics;

DETAILED DESCRIPTION OF THE PREFERRED EMBODIMENT

Figure 1:
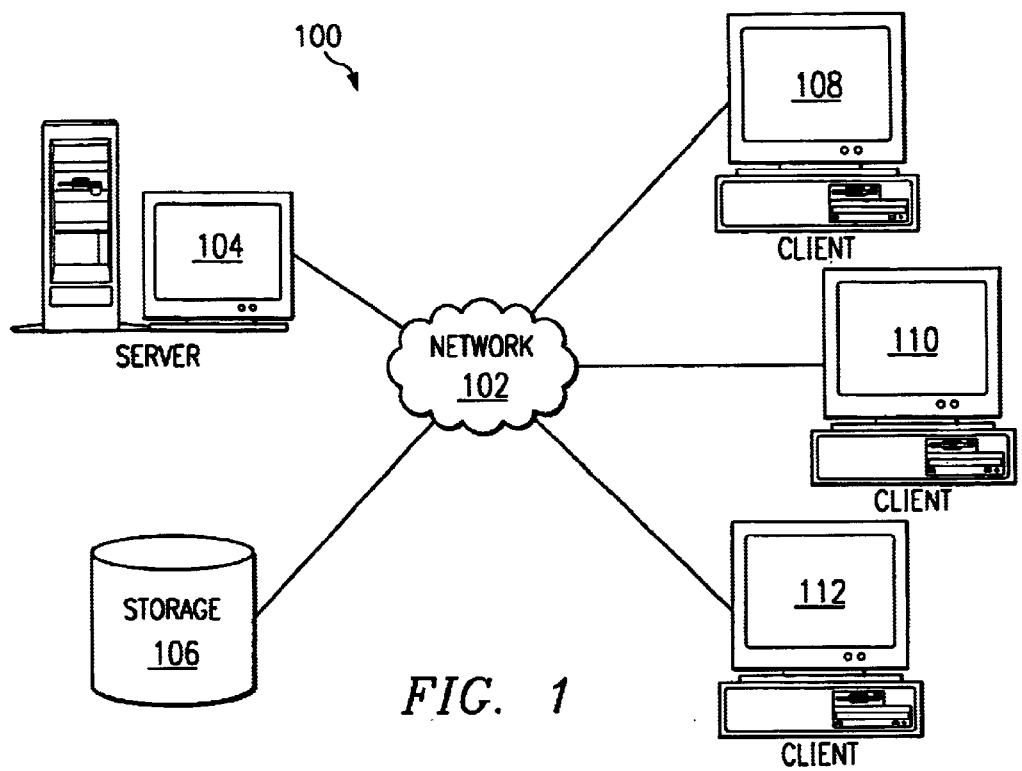
FIG. 1 is an illustration depicting a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention.

Figure 2A:
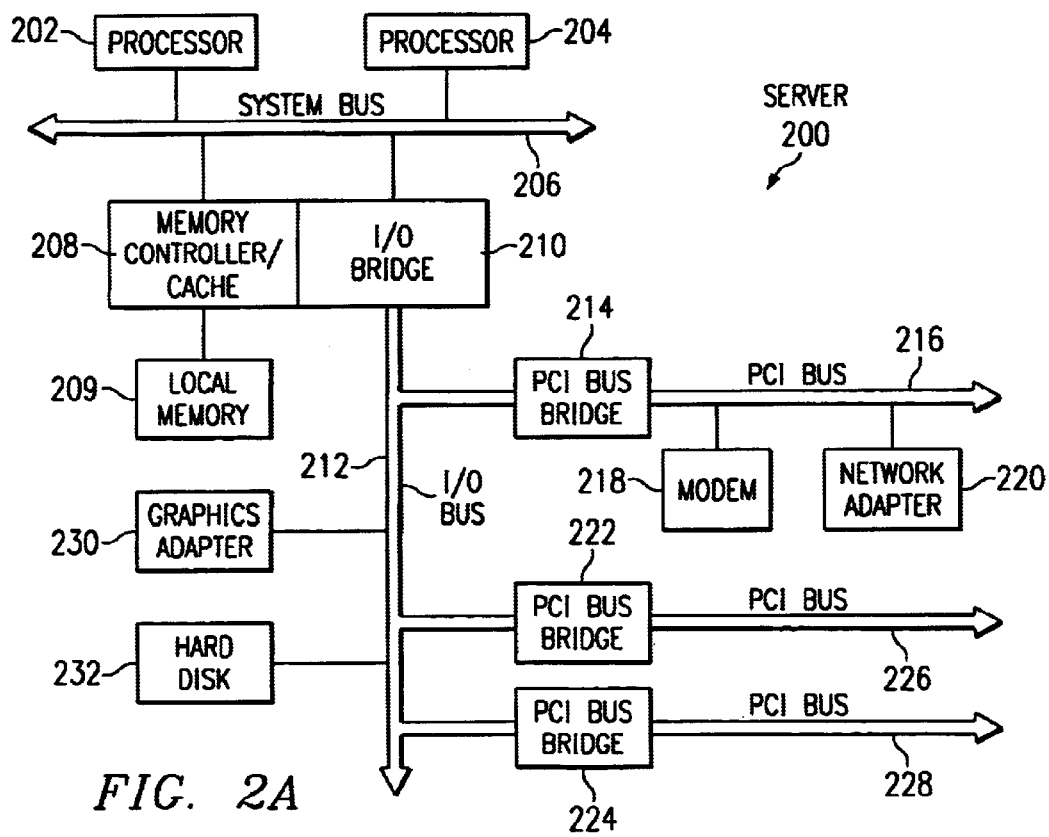
FIGS. 2A–B are block diagrams depicting a data processing system in which the present invention may be implemented.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
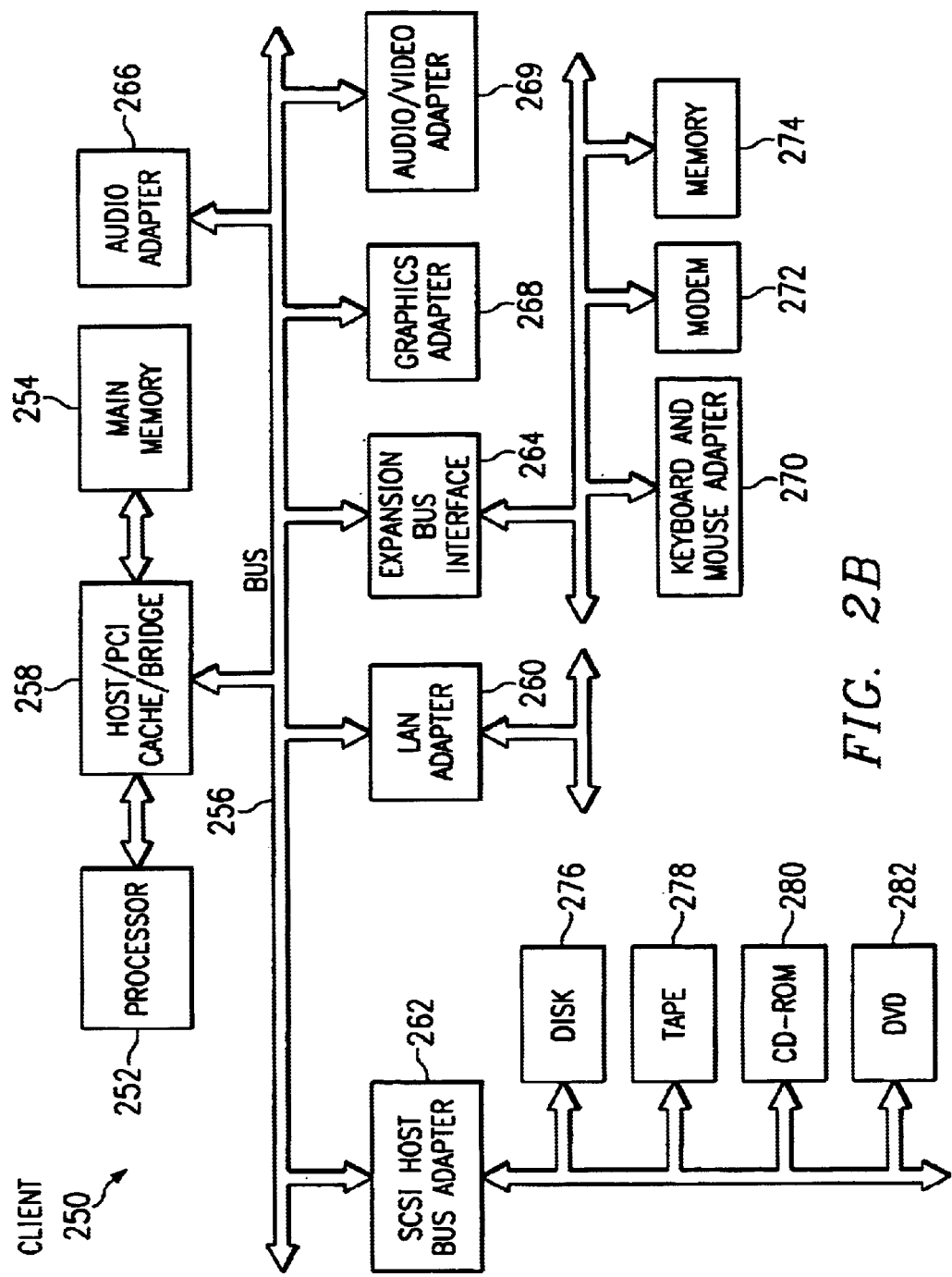

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local-bus implementations will support three or four PCI expansion slots or add-in connectors.

An operating system runs on processor 252 and is used to coordinate and provide control of various components within data processing system 250 in FIG. 2B. The operating system may be a commercially available operating system such as JavaOS For Business™ or OS/2™, which are available from International Business Machines Corporation™. JavaOS is loaded from a server on a network to a network client and supports Java programs and applets. A couple of characteristics of JavaOS that are favorable for performing traces with stack unwinds, as described below, are that JavaOS does not support paging or virtual memory. An object oriented programming system such as Java may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides a process and system for profiling software applications. Although the present invention may operate on a variety of computer platforms and operating systems, it may also operate within a Java runtime environment. Hence, the present invention may operate in conjunction with a Java virtual machine (JVM) yet within the boundaries of a JVM as defined by Java standard specifications. In order to provide a context for the present invention, portions of the operation of a JVM according to Java specifications are herein described.

With reference now to FIG. 3A, a block diagram illustrates the relationship of software components operating within a computer system-that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded pico-Java core.

At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Byte codes are may be translated into native code by a just-in-time compiler or JIT.

A JVM must load class files and execute the bytecodes within them. The JVM contains a class loader, which loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

Interpreting code provides an additional benefit. Rather than instrumenting the Java source code, the interpreter may be instrumented. Trace data may be generated via selected events and timers through the instrumented interpreter without modifying the source code. Profile instrumentation is discussed in more detail further below.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

With reference now to FIG. 3B, a block diagram of a JVM is depicted in accordance with a preferred embodiment of the present invention. JVM 350 includes a class loader subsystem 352, which is a mechanism for loading types, such as classes and interfaces, given fully qualified names. JVM 350 also contains runtime data areas 354, execution engine 356, native method interface 358, and memory management 374. Execution engine 356 is a mechanism for executing instructions contained in the methods of classes loaded by class loader subsystem 352. Execution engine 356 may be, for example, Java interpreter 362 or just-in-time compiler 360. Native method interface 358 allows access to resources in the underlying operating system. Native method interface 358 may be, for example, a Java native interface.

Runtime data areas 354 contain native method stacks 364, Java stacks 366, PC registers 368, method area 370, and heap 372. These different data areas represent the organization of memory needed by JVM 350 to execute a program.

Java stacks 366 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

PC registers 368 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 364 store the state of invocations of native methods. The state of native method invocations is stored in an implementation-dependent way in native method stacks, registers, or other implementation-dependent memory areas. In some JVM implementations, native method stacks 364 and Java stacks 366 are combined.

Method area 370 contains class data while heap 372 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 372.

JVM 350 includes an instruction that allocates memory space within the memory for heap 372 but includes no instruction for freeing that space within the memory. Memory management 374 in the depicted example manages memory space within the memory allocated to heap 370. Memory management 374 may include a garbage collector which automatically reclaims memory used by objects that are no longer referenced. Additionally, a garbage collector also may move objects to reduce heap fragmentation.

The processes within the following figures provide an overall perspective of the many processes employed within the present invention: processes that generate event-based profiling information in the form of specific types of records in a trace file; processes that generate sample-based profiling information in the form of specific types of records in a trace file; processes that read the trace records to generate more useful information to be placed into profile reports; and processes that generate the profile reports for the user of the profiling utility.

With reference now to FIG. 4, a block diagram depicts components used to profile processes in a data processing system. A trace program 400 is used to profile processes 402. Trace program 400 may be used to record data upon the execution of a hook, which is a specialized piece of code at a specific location in a routine or program in which other routines may be connected. Trace hooks are typically inserted for the purpose of debugging, performance analysis, or enhancing functionality. These trace hooks are employed to send trace data to trace program 400, which stores the trace data in buffer 404. The trace data in buffer 404 may be stored in a file for post-processing. With Java operating systems, the present invention employs trace hooks that aid in identifying methods that may be used in processes 402. In addition, since classes may be loaded and unloaded, these changes may also be identified using trace data. This is especially relevant with "network client" data processing systems, such as those that may operate under JavaOS, since classes and jitted methods may be loaded and unloaded more frequently due to the constrained memory and role as a network client.

Figure 5:
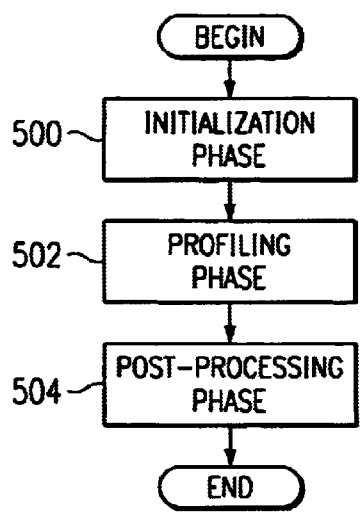
FIG. 5 is an illustration depicting various phases in profiling the active processes in an operating system.

With reference now to FIG. 5, a diagram depicts various phases in profiling the processes active in an operating system. Subject to memory constraints, the generated trace output may be as long and as detailed as the analyst requires for the purpose of profiling a particular program.

An initialization phase 500 is used to capture the state of the client machine at the time tracing is initiated. This trace initialization data includes trace records that identify all existing threads, all loaded classes, and all methods for the loaded classes. Records from trace data captured from hooks are written to indicate thread switches, interrupts, and loading and unloading of classes and jitted methods. Any class which is loaded has trace records that indicate the name of the class and its methods. In the depicted example, four byte IDs are used as identifiers for threads, classes, and methods. These IDs are associated with names output in the records. A record is written to indicate when all of the start up information has been written.

Next, during the profiling phase 502, trace records are written to a trace buffer or file. Trace records may originate from two types of profiling actions—event-based profiling and sample-based profiling. In the present invention, the trace file may have a combination of event-based records, such as those that may originate from a trace hook executed in response to a particular type of event, e.g., a method entry or method exit, and sample-based records, such as those that may originate from a stack walking function executed in response to a timer interrupt, e.g., a stack unwind record, also called a call stack record.

For example, the following process may occur during the profiling phase if the user of the profiling utility has requested sample-based profiling information. Each time a particular type of timer interrupt occurs, a trace record is written, which indicates the system program counter. This system program counter may be used to identify the routine that is interrupted. In the depicted example, a timer interrupt is used to initiate gathering of trace data. Of course, other types of interrupts may be used other than timer interrupts. Interrupts based on a programmed performance monitor event or other types of periodic events may be employed.

In the post-processing phase 504, the data collected in the buffer is sent to a file for post-processing. In one configuration, the file may be sent to a server, which determines the profile for the processes on the client machine. Of course, depending on available resources, the post-processing also may be performed on the client machine. In post-processing phase 504, B-trees and/or hash tables may be employed to maintain names associated with the records in the trace file to be processed. A hash table employs hashing to convert an identifier or a key, meaningful to a user, into a value for the location of the corresponding data in the table. While processing trace records, the B-trees and/or hash tables are updated to reflect the current state of the client machine, including newly loaded jitted code or unloaded code. Also, in the post-processing phase 504, each trace record is processed in a serial manner. As soon as the indicator is encountered that all of the startup information has been processed, event-based trace records from trace hooks and sample-based trace records from timer interrupts are then processed. Timer interrupt information from the timer interrupt records are resolved with existing hash tables. In addition, this information identifies the thread and function being executed. The data is stored in hash tables with a count identifying the number of timer tick occurrences associated with each way of looking at the data. After all of the trace records are processed, the information is formatted for output in the form of a report.

Alternatively, trace information may be processed on-the-fly so that trace data structures are maintained during the profiling phase. In other words, while a profiling function, such as a timer interrupt, is executing, rather than (or in addition to) writing trace records to a buffer or file, the trace record information is processed to construct and maintain any appropriate data structures.

For example, during the processing of a timer interrupt during the profiling phase, a determination could be made as to whether the code being interrupted is being interpreted by the Java interpreter. If the code being interrupted is interpreted, the method ID of the method being interpreted, may be placed in the trace record. In addition, the name of the method may be obtained and placed in the appropriate B-tree. Once the profiling phase has completed, the data structures may contain all the information necessary for generating a profile report without the need for post-processing of the trace file.

Figure 6:
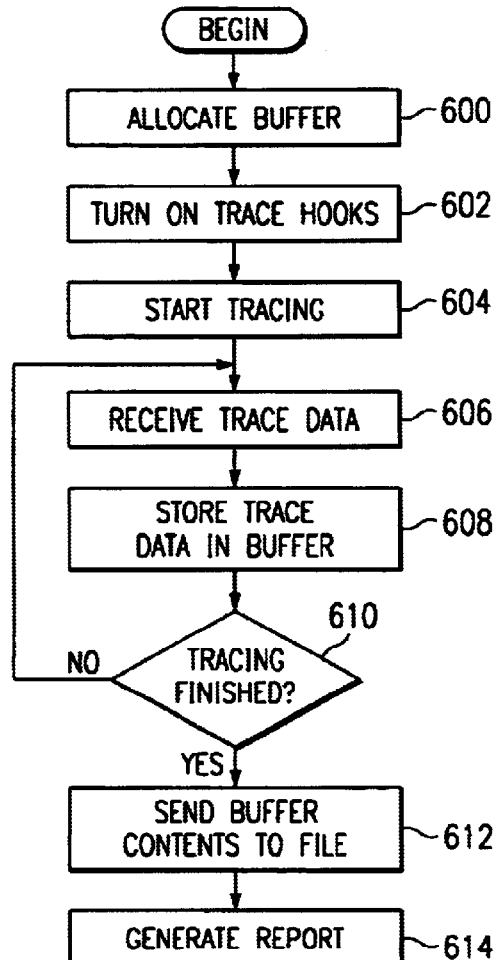
FIG. 6 is a flowchart depicting a process used by a trace program for generating trace records from processes executing on a data processing system.

With reference now to FIG. 6, a flowchart depicts a process used by a trace program for generating trace records from processes executing on a data processing system. FIG. 6 provides further detail concerning the generation of trace records that were not described with respect to FIG. 5.

Trace records may be produced by the execution of small pieces of code called "hooks". Hooks may be inserted in various ways into the code executed by processes, including statically (source code) and dynamically (through modification of a loaded executable). This process is employed after trace hooks have already been inserted into the process or processes of interest. The process begins by allocating a buffer (step 600), such as buffer 404 in FIG. 4. Next, in the depicted example, trace hooks are turned on (step 602), and tracing of the processes on the system begins (step 604). Trace data is received from the processes of interest (step 606). This type of tracing may be performed during phases 500 and/or 502. This trace data is stored as trace records in the buffer (step 608). A determination is made as to whether tracing has finished (step 610). Tracing finishes when the trace buffer has been filled or the user stops tracing via a command and requests that the buffer contents be sent to file. If tracing has not finished, the process returns to step 606 as described above.

Otherwise, when tracing is finished, the buffer contents are sent to a file for post-processing (step 612). A report is then generated in post-processing (step 614) with the process terminating thereafter.

Although the depicted example uses post-processing to analyze the trace records, the processes of the present invention may be used to process trace information in real-time depending on the implementation.

Figure 7:
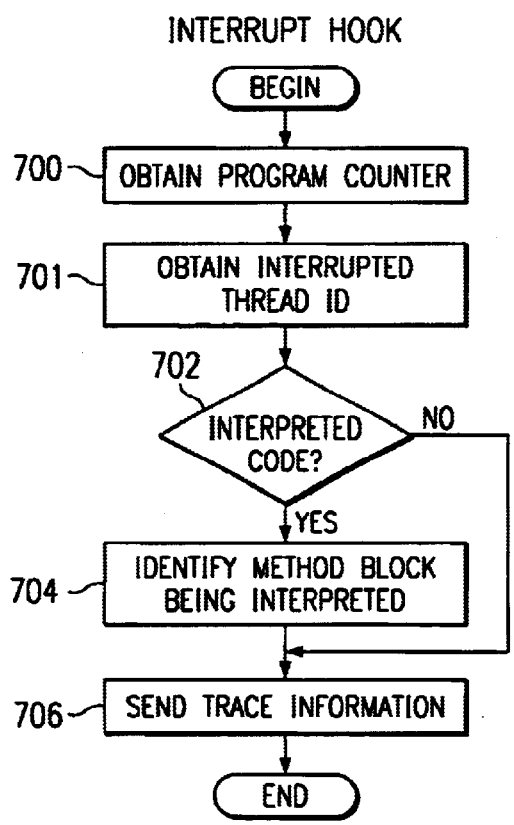
FIG. 7 is a flowchart depicting a process used in a system interrupt handler trace hook.

With reference now to FIG. 7, a flowchart depicts a process that may be used during an interrupt handler trace hook.

The process begins by obtaining a program counter (step 700). Typically, the program counter is available in one of the saved program stack areas. Thereafter, a determination is made as to whether the code being interrupted is interpreted code (step 702). This determination may be made by determining whether the program counter is within an address range for the interpreter used to interpret bytecodes. If the code being interrupted is interpreted, a method block address is obtained for the code being interpreted. A trace record is then written (step 706). The trace record is written by sending the trace information to a trace program, such as trace program 400, which generates trace records for post-processing in the depicted example. This trace record is referred to as an interrupt record, or an interrupt hook.

This type of trace may be performed during phase 502. Alternatively, a similar process, i.e. determining whether code that was interrupted is interpreted code, may occur during post-processing of a trace file.

In addition to event-based profiling, a set of processes may be employed to obtain sample-based profiling information. As applications execute, the applications may be periodically interrupted in order to obtain information about the current runtime environment. This information may be written to a buffer or file for post-processing, or the information may be processed on-the-fly into data structures representing an ongoing history of the runtime environment. FIGS. 8 and 9 describe sample-based profiling in more detail.

A sample-based profiler obtains information from the stack of an interrupted thread. The thread is interrupted by a timer interrupt presently available in many operating systems. The user of the trace facility selects either the program counter option or the stack unwind option, which may be accomplished by enabling one major code or another major code, as described further below. This timer interrupt is employed to sample information from a call stack. By walking back up the call stack, a complete call stack can be obtained for analysis. A "stack walk" may also be described as a "stack unwind", and the process of "walking the stack" may also be described as "unwinding the stack." Each of these terms illustrates a different metaphor for the process. The process can be described as "walking" as the process must obtain and process the stack frames step-by-step. The process may also be described as "unwinding" as the process must obtain and process the stack frames that point to one another, and these pointers and their information must be "unwound" through many pointer dereferences.

The stack unwind follows the sequence of functions/method calls at the time of the interrupt. A call stack is an ordered list of routines plus offsets within routines (i.e. modules, functions, methods, etc.) that have been entered during execution of a program. For example, if routine A calls routine B, and then routine B calls routine C, while the processor is executing instructions in routine C, the call stack is ABC. When control returns from routine C back to routine B, the call stack is AB. For more compact presentation and ease of interpretation within a generated report, the names of the routines are presented without any information about offsets. Offsets could be used for more detailed analysis of the execution of a program, however, offsets are not considered further herein.

Thus, during timer interrupt processing or at post-processing, the generated sample-based profile information reflects a sampling of call stacks, not just leaves of the possible call stacks, as in some program counter sampling techniques. A leaf is a node at the end of a branch, i.e. a node that has no descendants. A descendant is a child of a parent node, and a leaf is a node that has no children.

With reference now FIG. 8, a diagram depicts the call stack containing stack frames. A "stack" is a region of reserved memory in which a program or programs store status data, such as procedure and function call addresses, passed parameters, and sometimes local variables. A "stack frame" is a portion of a thread's stack that represents local storage (arguments, return addresses, return values, and local variables) for a single function invocation. Every active thread of execution has a portion of system memory allocated for its stack space. A thread's stack consists of sequences of stack frames. The set of frames on a thread's stack represent the state of execution of that thread at any time. Since stack frames are typically interlinked (e.g., each stack frame points to the previous stack frame), it is often possible to trace back up the sequence of stack frames and develop the "call stack". A call stack represents all not-yet-completed function calls—in other words, it reflects the function invocation sequence at any point in time.

Call stack 800 includes information identifying the routine that is currently running, the routine that invoked it, and so on all the way up to the main program. Call stack 800 includes a number of stack frames 802, 804, 806, and 808. In the depicted example, stack frame 802 is at the top of call stack 800, while stack frame 808 is located at the bottom of call stack 800. The top of the call stack is also referred to as the "root". The timer interrupt (found in most operating systems) is modified to obtain the program counter value (pcv) of the interrupted thread, together with the pointer to the currently active stack frame for that thread. In the Intel architecture, this is typically represented by the contents of registers: EIP (program counter) and EBP (pointer to stack frame). By accessing the currently active stack frame, it is possible to take advantage of the (typical) stack frame linkage convention in order to chain all of the frames together. Part of the standard linkage convention also dictates that the function return address be placed just above the invoked-function's stack frame; this can be used to ascertain the address for the invoked function. While this discussion employs an Intel-based architectures, this example is not a restriction. Most architectures employ linkage conventions that can be similarly navigated by a modified profiling interrupt handler.

When a timer interrupt occurs, the first parameter acquired is the program counter value. The next value is the pointer to the top of the current stack frame for the interrupted thread. In the depicted example, this value would point to EBP 808a in stack frame 808. In turn, EBP 808 points to EBP 806a in stack frame 806, which in turn points to EBP 804a in stack frame 804. In turn, this EBP points to EBP 802a in stack frame 802. Within stack frames 802–808 are EIPs 802b–808b, which identify the calling routine's return address. The routines may be identified from these addresses. Thus, routines are defined by collecting all of the return addresses by walking up or backwards through the stack.

With reference now to the FIG. 9, an illustration of a call stack is depicted. A call stack, such as call stack 900 is obtained by walking the call stack. A call stack is obtained each time a periodic event, such as, for example, a timer interrupt occurs. These call stacks may be stored as call stack unwind trace records within the trace file for post-processing or may be processed on-the-fly while the program continues to execute.

In the depicted example, call stack 900 contains a pid 902, which is the process identifier, and a tid 904, which is the thread identifier. Call stack 900 also contains addresses addr1 906, addr2 908 . . . addrN 910. In this example, addr1 906 represents the value of the program counter at the time of the interrupt. This address occurs somewhere within the scope of the interrupted function, addr2 908 represents an address within the process that called the function that was interrupted. For Intel-processor-based data processing systems, it represents the return address for that call; decrementing that value by 4 results in the address of the actual call, also known as the call-site. This corresponds with EIP 808b in FIG. 8; addrN 910 is the top of the call stack (EIP 802b). The call stack that would be returned if the timer interrupt interrupted the thread whose call stack state is depicted in FIG. 8 would consist of: a pid, which is the process id of the interrupted thread; a tid, which is the thread id for the interrupted thread; a pcv, which is a program counter value (not shown on FIG. 8):for the interrupted thread; EIP 808b; EIP 806b; EIP 804b; and EIP 802b. In terms of FIG. 9, pcv=addr1, EIP 808b=addr2, EIP 806b=addr3, EIP 804b=addr4, EIP 802b=addr5.

With reference now to FIG. 10A, a diagram of a program execution sequence along with the state of the call stack at each function entry/exit point is provided. The illustration shows entries and exits occurring at regular time intervals, but this is only a simplification for the illustration. If each function (A, B, C, and X in the figure) were instrumented with entry/exit event hooks, then complete accounting of the time spent within and below each function would be readily obtained. Note in FIG. 10A that at time 0, the executing thread is in routine C. The call stack at time 0 is C. At time 1, routine C calls routine A, and the call stack becomes CA and so on. It should be noted that the call stack in FIG. 10A is a reconstructed call stack that is generated by processing the event-based trace records in a trace file to follow such events as method entries and method exits.

The accounting technique and data structure are described in more detail further below. Unfortunately, this type of instrumentation can be expensive, can introduce bias, and in some cases, can be hard to apply. Sample-based profiling, by sampling the program's call stack, helps to alleviate the performance bias (and other complications) that entry/exit hooks produce.

Consider FIG. 10B, in which the same program is executed but is being sampled on a regular basis (in the example, the interrupt occurs at a frequency equivalent to two timestamp values). Each sample includes a snapshot of the interrupted thread's call stack. Not all call stack combinations are seen with this technique (note that routine X does not show up at all in the set of call stack samples in FIG. 10B). This is an acceptable limitation of sampling. The idea is that with an appropriate sampling rate (e.g., 30–1000 times per second), the call stacks in which most of the time is spent will be identified. Although some call stacks are omitted, it is a minor issue provided these call stacks are combinations for which little time is consumed.

In the event-based traces, there is a fundamental assumption that the traces contain information about routine entries and matching routine exits. Often, entry-exit-pairs are nested in the traces because routines call other routines. Time spent (or memory consumed) between entry into a routine and exit from the same routine is attributed to that routine, but a user of a profiling tool may want to distinguish between time spent directly in a routine and time spent in other routines that it calls.

FIG. 10C shows an example of the manner in which time may be expended by two routines: a program's "main" calls routine A at time "t" equal to zero; routine A computes for 1 ms and then calls routine B; routine B computes for 8 ms and then returns to routine A; routine A computes for 1 ms and then returns to "main". From the point of view of "main", routine A took 10 ms to execute, but most of that time was spent executing instructions in routine B and was not spent executing instructions within routine A. This is a useful piece of information for a person attempting to optimize the example program. In addition, if routine B is called from many places in the program, it might be useful to know how much of the time spent in routine B was on behalf of (or when called by) routine A and how much of the time was on behalf of other routines.

A fundamental concept in the output provided by the methods described herein is the call stack. The call stack consists of the routine that is currently running, the routine that invoked it, and so on all the way up to main. A profiler may add a higher, thread level with the pid/tid (the process IDs and thread IDs). In any case, an attempt is made to follow the trace event records, such as method entries and exits, as shown in FIG. 10A, to reconstruct the structure of the call stack frames while the program was executing at various times during the trace.

The post-processing of a trace file may result in a report consisting of three kinds of time spent in a routine, such as routine A: (1) base time—the time spent executing code in routine A itself; (2) cumulative time (or "cum time" for short)—the time spent executing in routine A plus all the time spent executing every routine that routine A calls (and all the routines they call, etc.); and (3) wall-clock time or elapsed time. This type of timing information may be obtained from event-based trace records as these records have timestamp information for each record.

A routine's cum time is the sum of all the time spent executing the routine plus the time spent executing any other routine while that routine is below it on the call stack. In the example above in FIG. 10C, routine A's base time is 2 ms, and its cum time is 10 ms. Routine B's base time is 8 ms, and its cum time is also 8 ms because it does not call any other routines. It should be noted that cum time may not be generated if a call stack tree is being generated on-the-fly—cum time may only be computed after the fact during the post-processing phase of a profile utility.

For wall-clock or elapsed time, if while routine B was running, the system fielded an interrupt or suspended this thread to run another thread, or if routine B blocked waiting on a lock or I/O, then routine B and all the entries above routine B on the call stack accumulate elapsed time but not base or cum time. Base and cum time are unaffected by interrupts, dispatching, or blocking. Base time only increases while a routine is running, and cum time only increases while the routine or a routine below it on the call stack is running.

In the example in FIG. 10C, routine A's elapsed time is the same as its cum time—10 ms. Changing the example slightly, suppose there was a 1 ms interrupt in the middle of B, as shown in FIG. 10D. Routine A's base and cum time are unchanged at 2 ms and 10 ms, but its elapsed time is now 11 ms.

Although base time, cum time and elapsed time were defined in terms of processor time spent in routines, sample based profiling is useful for attributing consumption of almost any system resource to a set of routines, as described in more detail below with respect to FIG. 11B. Referring to FIG. 10C again, if routine A initiated two disk I/O's, and then routine B initiated three more I/O's when called by routine A, routine A's "base I/O's" are two and routine A's "cum I/O's" are five. "Elapsed I/O's" would be all I/O's, including those by other threads and processes, that occurred between entry to routine A and exit from routine A. More general definitions for the accounting concepts during profiling would be the following: base—the amount of the tracked system resource consumed directly by this routine; cum—the amount of the tracked system resource consumed by this routine and all routines below it on the call stack; elapsed—the total amount of the tracked system resource consumed (by any routine) between entry to this routine and exit from the routine.

As noted above, FIGS 10A–10D describe the process by which a reconstructed call stack may be generated by processing the event-based trace records in a trace file by following such events as method entries and method exits. Hence, although FIGS. 11A–14 describe call stack trees that may be applicable to processing sample-based trace records, the description below for generating or reconstructing call stacks and call stack trees in FIGS. 11A–14 is mainly directed to the processing of event-based trace records.

Figure 11A:
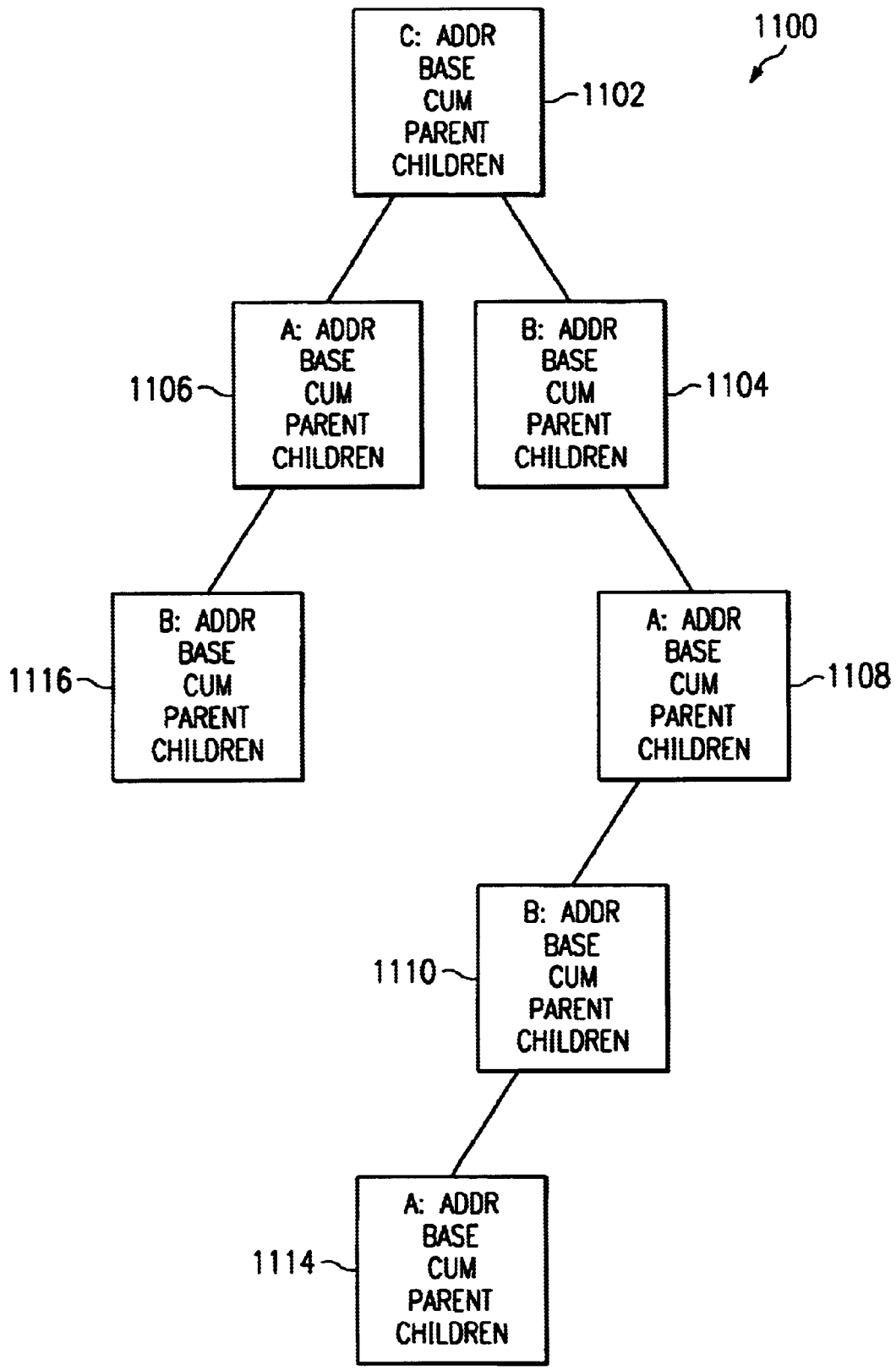
FIG. 11A is a diagram depicting a tree structure generated from sampling a call stack.

With reference now to FIG. 11A, a diagram depicts a tree structure generated from trace data. This figure illustrates a call stack tree 1100 in which each node in tree structure 1100 represents a function entry point.

Additionally, in each node in tree structure 1100, a number of statistics are recorded. In the depicted example, each node, nodes 1102–1108, contains an address (addr), a base time (BASE), cumulative time (CUM) and parent and children pointers. As noted above, this type of timing information may be obtained from event-based trace records as these records have timestamp information for each record. The address represents a function entry point. The base time represents the amount of time consumed directly by this thread executing this function. The cumulative time is the amount of time consumed by this thread executing this function and all functions below it on the call stack. In the depicted example, pointers are included for each node. One pointer is a parent pointer, a pointer to the node's parent. Each node also contains a pointer to each child of the node.

Those of ordinary skill in the art will appreciate that tree structure 1100 may be implemented in a variety of ways and that many different types of statistics may be maintained at the nodes other than those in the depicted example.

The call stack is developed from looking back at all return addresses. These return addresses will resolve within the bodies of those functions. This information allows for accounting discrimination between distinct invocations of the same function. In other words, if function X has 2 distinct calls to function A, the time associated with those calls can be accounted for separately. However, most reports would not make this distinction.

Figures 11B, 12:
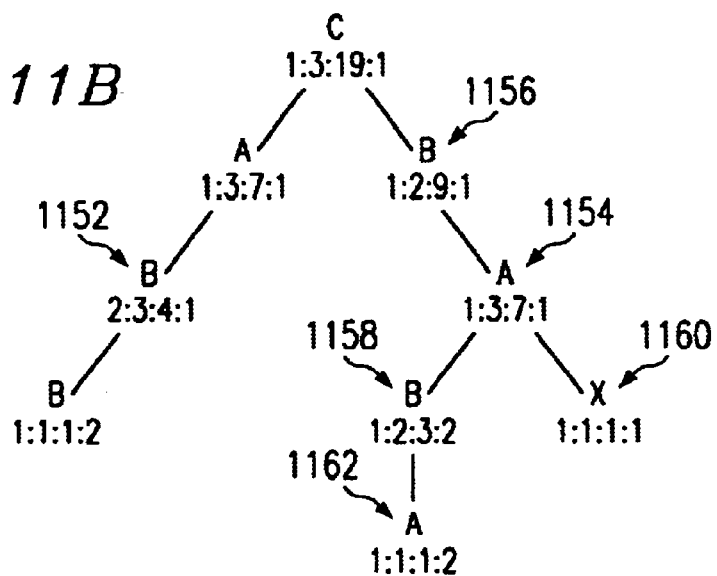
FIG. 11B is a diagram depicting an event tree which reflects call stacks observed during system execution.
FIG. 12 is a table depicting a call stack tree.

With reference now to FIG. 11B, a call stack tree which reflects call stacks observed during a specific example of system execution will now be described. At each node in the tree, several statistics are recorded. In the example shown in FIG. 11B, the statistics are time-based statistics. The particular statistics shown include the number of distinct times the call stack is produced, the sum of the time spent in the call stack, the total time spent in the call stack plus the time in those call stacks invoked from this call stack (referred to as cumulative time), and the number of instances of this routine above this instance (indicating depth of recursion).

For example, at node 1152 in FIG. 11B, the call stack is CAB, and the statistics kept for this node are 2:3:4:1. Note that call stack CAB is first produced at time 2 in FIG. 10A, and is exited at time 3. Call stack CAB is produced again at time 4, and is exited at time 7. Thus, the first statistic indicates that this particular call stack, CAB, is produced twice in the trace. The second statistic indicates that call stack CAB exists for three units of time (at time 2, time 4, and time 6). The third statistic indicates the cumulative amount of time spent in call stack CAB and those call stacks invoked from call stack CAB (i.e., those call stacks having CAB as a prefix, in this case CABB). The cumulative time in the example shown in FIG. 11B is four units of time. Finally, the recursion depth of call stack CAB is one, as none of the three routines present in the call stack have been recursively entered.

Those skilled in the art will appreciate that the tree structure depicted in FIG. 11B may be implemented in a variety of ways, and a variety of different types of statistics may be maintained at each node. In the described embodiment, each node in the tree contains data and pointers. The data include the name of the routine at that node, and the four statistics discussed above. Of course, many other types of statistical information may be stored at each node. In the described embodiment, the pointers for each node include a pointer to the node's parent, a pointer to the first child of the node (i.e. the left-most child), a pointer-to the next sibling of the node, and a pointer to the next instance of a given routine in the tree. For example, in FIG. 11B, node 1154 would contain a parent pointer to node 1156, a first child pointer to node 1158, a next sibling pointer equal to NULL (note that node 1154 does not have a next sibling), and a next instance pointer to node 1162. Those skilled in the art will appreciate that other pointers may be stored to make subsequent analysis more efficient. In addition, other structural elements, such as tables for the properties of a routine that are invariant across instances (e.g., the routine's name), may also be stored.

The type of performance information and statistics maintained at each node are not constrained to time-based performance statistics. The present invention may be used to present many types of trace information in a compact manner which supports performance queries. For example, rather than keeping statistics regarding time, tracing may be used to track the number of Java bytecodes executed in each method (i.e., routine) called. The tree structure of the present invention would then contain statistics regarding bytecodes executed rather than time. In particular, the quantities recorded in the second and third categories would reflect the number of bytecodes executed rather than the amount of time spent in each method.

Tracing may also be used to track memory allocation and deallocation. Every time a routine creates an object, a trace record could be generated. The tree structure of the present invention would then be used to efficiently store and retrieve information regarding memory allocation. Each node would represent the number of method calls, the amount of memory allocated within a method, the amount of memory allocated by methods called by the method, and the number of methods above this instance (i.e., the measure of recursion). Those skilled in the art will appreciate that the tree structure of the present invention may be used to represent a variety of performance data in a manner which is very compact, and allows a wide variety of performance queries to be performed.

The tree structure shown in FIG. 11B depicts one way in which data may be pictorially presented to a user. The same data may also be presented to a user in tabular form as shown in FIG. 12.

With reference now to FIG. 12, a call stack tree presented as a table will now be described. Note that FIG. 12 contains a routine, pt_pidtid, which is the main process/thread which calls routine C. Table 12 includes columns of data for Level 1230, RL 1232, Calls 1234, Base 1236, Cum 1238, and Indent 1240. Level 1230 is the tree level (counting from the root as level 0) of the node. RL 1232 is the recursion level. Calls 1234 is the number of occurrences of this particular call stack, i.e., the number of times this distinct call stack configuration occurs. Base 1236 is the total observed time in the particular call stack, i.e., the total time that the stack had exactly these routines on the stack. Cum 1238 is the total time in the particular call stack plus deeper levels below it. Indent 1240 depicts the level of the tree in an indented manner. From this type of call stack configuration information, it is possible to infer each unique call stack configuration, how many times the call stack configuration occurred, and how long it persisted on the stack. This type of information also provides the dynamic structure of a program, as it is possible to see which routine called which other routine. However, there is no notion of time-order in the call stack tree. It cannot be inferred that routines at a certain level were called before or after other routines on the same level.

Figure 13:
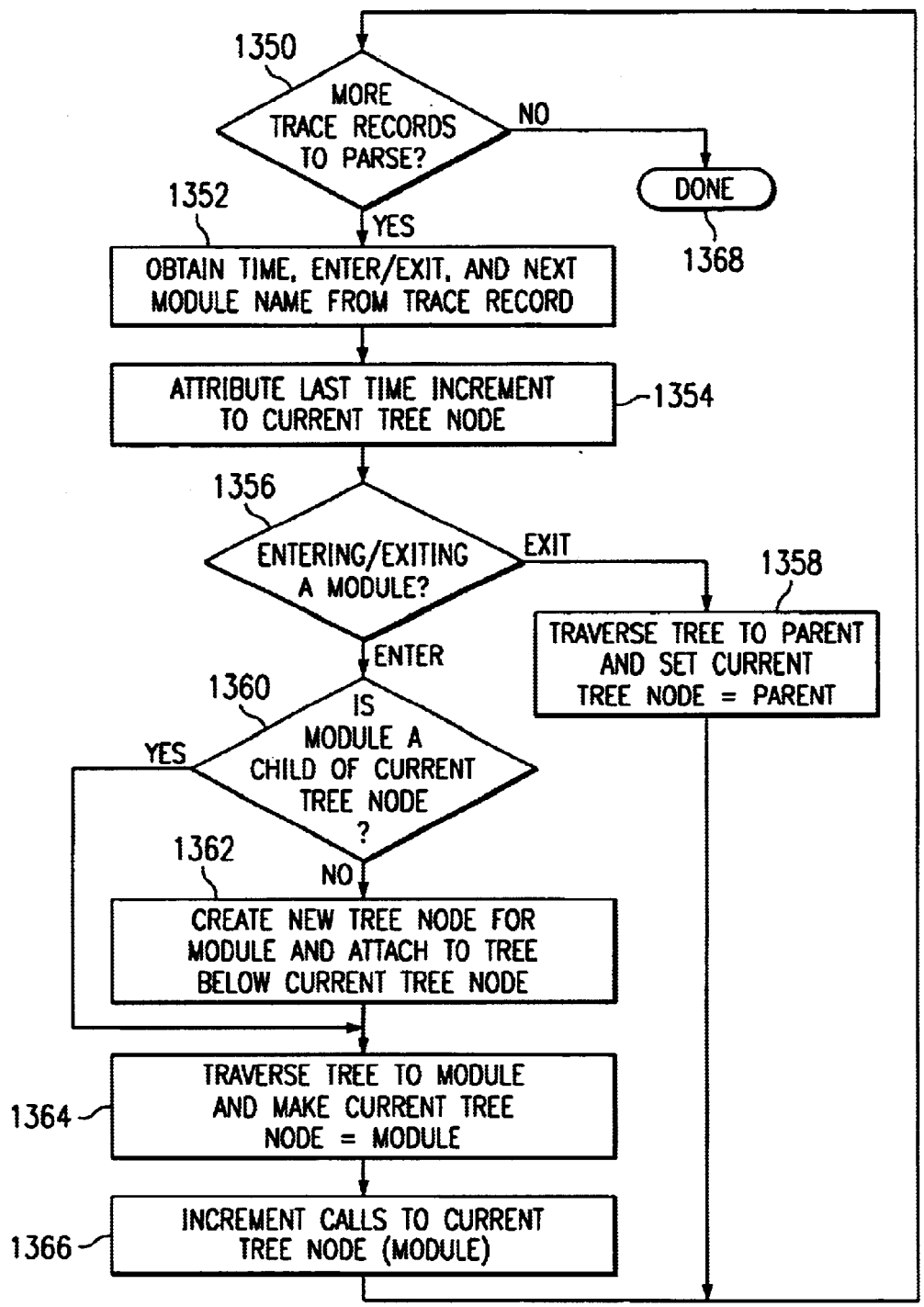
FIG. 13 is a flow chart depicting a method for building a call stack tree using a trace text file as input.

The pictorial view of the call stack tree, as illustrated in FIG. 11B, may be built dynamically or built statically using a trace text file or binary file as input. FIG. 13 depicts a flow chart of a method for building a call stack tree using a trace text file as input. In FIG. 13, the call stack tree is built to illustrate module entry and exit points.

With reference now to FIG. 13, it is first determined if there are more trace records in the trace text file (step 1350). If so, several pieces of data are obtained from the trace record, including the time, whether the event is an enter or an exit, and the module name (step 1352). Next, the last time increment is attributed to the current node in the tree (step 1354). A check is made to determine if the trace record is an enter or an exit record (step 1356). If it is an exit record, the tree is traversed to the parent (using the parent pointer), and the current tree node is set equal to the parent node (step 1358). If the trace record is an enter record, a check is made to determine if the module is already a child node of the current tree node (step 1360). If not, a new node is created for the module and it is attached to the tree below the current tree node (step 1362). The tree is then traversed to the module's node, and the current tree node is set equal to the module node (step 1364). The number of calls to the current tree node is then incremented (step 1366). This process is repeated for each trace record in the trace output file, until there are no more trace records to parse (step 1368).

Figure 14:
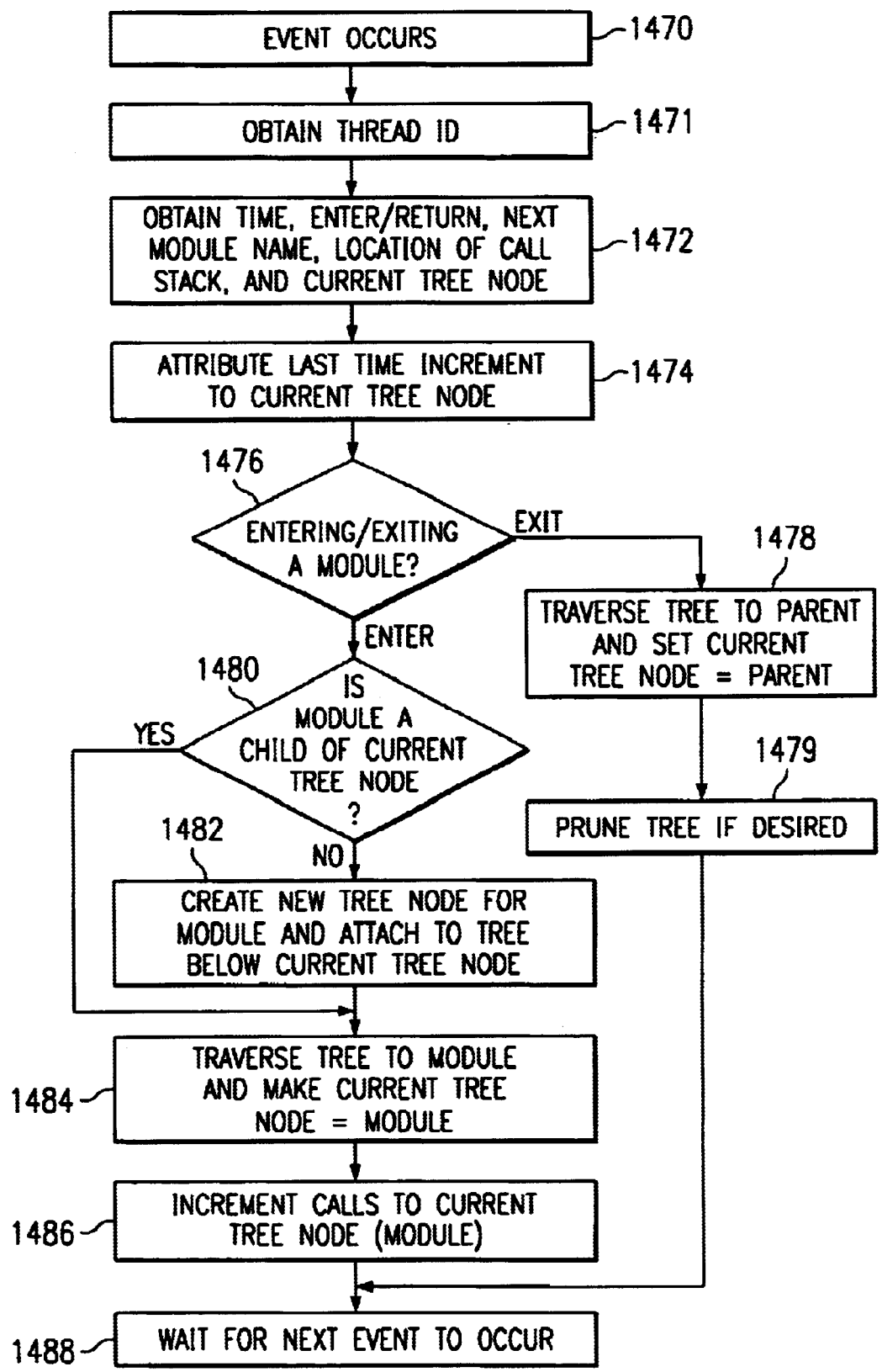
FIG. 14 is a flow chart depicting a method for building a call stack tree dynamically as tracing is taking place during system execution.

With reference now to FIG. 14, a flow chart depicts a method for building a call stack tree dynamically as tracing is taking place during system execution. In FIG. 14, as an event is logged, it is added to the tree in real time. Preferably, a call stack tree is maintained for each thread. The call stack tree reflects the call stacks recorded to date, and a current tree node field indicates the current location in a particular tree. When an event occurs (step 1470), the thread ID is obtained (step 1471). The time, type of event (i.e., in this case, whether the event is a method entry or exit), the name of the module (i.e., method), location of the thread's call stack, and location of the thread's "current tree node" are then obtained (step 1472). The last time increment is attributed to the current tree node (step 1474). A check is made to determine if the trace event is an enter or an exit event (step 1476). If it is an exit event, the tree is traversed to the parent (using the parent pointer), and the current tree node is set equal to the parent node (step 1478). At this point, the tree can be dynamically pruned in order to reduce the amount of memory dedicated to its maintenance (step 1479). Pruning is discussed in more detail below. If the trace event is an enter event, a check is made to determine if the module is already a child node of the current tree node (step 1480). If not, a new node is created for the module, and it is attached to the tree below the current tree node (step 1482). The tree is then traversed to the module's node, and the current tree node is set equal to the module node (step 1484). The number of calls to the current tree node is then incremented (step 1486). Control is then passed back to the executing module, and the dynamic tracing/reduction program waits for the next event to occur (step 1488).

One of the advantages of using the dynamic tracing/reduction technique described in FIG. 14 is its enablement of long-term system trace collection with a finite memory buffer. Very detailed performance profiles may be obtained without the expense of an "infinite" trace buffer. Coupled with dynamic pruning, the method depicted in FIG. 14 can-support a fixed-buffer-size trace mechanism.

The use of dynamic tracing and reduction (and dynamic pruning in some cases) is especially useful in profiling the performance characteristics of long running programs. In the case of long running programs, a finite trace buffer can severely impact the amount of useful trace information that may be collected and analyzed. By using dynamic tracing and reduction (and perhaps dynamic pruning), an accurate and informative performance profile may be obtained for a long running program.

Many long-running applications reach a type of steady-state, where every possible routine and call stack is present in the tree and updating statistics. Thus, trace data can be recorded and stored for such applications indefinitely within the constraints of a bounded memory requirement using dynamic pruning. Pruning has value in reducing the memory requirement for those situations in which the call stacks are actually unbounded. For example, unbounded call stacks are produced by applications that load and run other applications.

Pruning can be performed in many ways, and a variety of pruning criteria is possible. For example, pruning decisions may be based on the amount of cumulative time attributed to a subtree. Note that pruning may be disabled unless the amount of memory dedicated to maintaining the call stack exceeds some limit. As an exit event is encountered (such as step 1478 in FIG. 14), the cumulative time associated with the current node is compared with the cumulative time associated with the parent node. If the ratio of these two cumulative times does not exceed a pruning threshold (e.g., 0.1), then the current node and all of its descendants are removed from the tree. The algorithm to build the tree proceeds as before by traversing to the parent, and changing the current node to the parent.

Many variations of the above pruning mechanism are possible. For example, the pruning threshold can be raised or lowered to regulate the level of pruning from very aggressive to none. More global techniques are also possible, including a periodic sweep of the entire call stack tree, removing all subtrees whose individual cumulative times are not a significant fraction of their parent node's cumulative times.

Data reduction allows analysis programs to easily and quickly answer many questions regarding how computing time was spent within the traced program. This information may be gathered by "walking the tree" and accumulating the data stored at various nodes within the call stack tree, from which it can be determined the amount of time spent strictly within routine A, the total amount of time spent in routine A and in the routines called by routine A either directly or indirectly, etc.

With reference now to FIG. 15, a diagram of a record generated using the processes of present invention is depicted. Each routine in record 1500 is listed separately, along with information regarding the routine in FIG. 15. For example, calls column 1502 lists the number of times each routine has been called. BASE column 1504 contains the total time spent in the routine, while CUM column 1506 includes the cumulative time spent in the routine and all routines called by the routine. Name column 1508 contains-the name of the routine.

With reference now to FIG. 16, a diagram of another type of report that may be produced is depicted. The report depicted in FIG. 16 illustrates much of the same information found in FIG. 15, but in a slightly different format. As with FIG. 15, diagram 1600 includes information on calls, base time, and cumulative time.

FIG. 16 shows a sample-based trace output containing times spent within various routines as measured in microseconds. FIG. 16 contains one stanza (delimited by horizontal lines) for each routine that appears in the sample-based trace output. The stanza contains information about the routine itself on the line labeled "Self", about who called it on lines labeled "Parent", and about who the routine called on lines labeled "Child". The stanzas are in order of cum time. The third stanza is about routine A, as indicated by the line beginning with "Self." The numbers on the "Self" line of this stanza show that routine A was called three times in this trace, once by routine C and twice by routine B. In the profile terminology, routines C and B are (immediate) parents of routine A. Routine A is a child of routines C and B. All the numbers on the "Parent" rows of the second stanza are breakdowns of routine A's corresponding numbers. Three microseconds of the seven microsecond total base time spent in A was when it was called by routine C, and three microseconds when it was first called by routine B, and another one microsecond when it was called by routine B for a second time. Likewise, in this example, half of routine A's fourteen microsecond cum time was spent on behalf of each parent.

Looking now at the second stanza, we see that routine C called routine B and routine A once each. All the numbers on "Child" rows are subsets of numbers from the child's profile. For example, of the three calls to routine A in this trace, one was by routine C; of routine A's seven microsecond total base time, three microseconds were while it was called directly by routine C; of routine A's fourteen microsecond cum time, seven microseconds was on behalf of routine C. Notice that these same numbers are the first row of the third stanza, where routine C is listed as one of routine A's parents.

The four relationships that are true of each stanza are summarized at the top of FIG. 16. First, the sum of the numbers in the Calls column for parents equals the number of calls on the self row. Second, the sum of the numbers in the Base column for parents equals Self's base. Third, the sum of the numbers in the Cum column for parents equals Self's Cum. These first three invariants are true because these characteristics are the definition of Parent; collectively they are supposed to account for all of Self's activities. Fourth, the Cum in the Child rows accounts for all of Self's Cum except for its own Base.

Program sampling contains information from the call stack and provides a profile, reflecting the sampling of an entire call stack, not just the leaves. Furthermore, the sample-based profiling technique may also be applied to other types of stacks. For example, with Java programs, a large amount of time is spent in a routine called the "interpreter". If only the call stack was examined, the profile would not reveal much useful information. Since the interpreter also tracks information in its own stack, e.g., a Java stack (with its own linkage conventions), the process can be used to walk up the Java stack to obtain the calling sequence from the perspective of the interpreted Java program.

With reference now to FIG. 17, a figure depicts a report generated from a trace file containing both event-based profiling information (method entry/exits) and sample-based profiling information (stack unwinds). FIG. 17 is similar to FIG. 12, in which a call stack tree is presented as a report, except that FIG. 17 contains embedded stack walking information. Call stack tree 1700 contains two stack unwinds generated within the time period represented by the total of 342 ticks. Stack unwind identifier 1702 denotes the beginning of stack unwind information 1706, with the names of routines that are indented to the right containing the stack information that the stack walking process was able to discern. Stack unwind identifier 1704 denotes the beginning of stack unwind information 1708. In this example, "J:" identifies an interpreted Java method and "F:" identifies a native function, such as a native function within JavaOS. A call from a Java method to a native method is via "ExecuteJava." Hence, at the point at which the stack walking process reaches a stack frame for an "ExecuteJava," it cannot proceed any further up the stack as the stack frames are discontinued. The process for creating a tree containing both event-based nodes and sample-based nodes is described in more detail further below. In this case, identifiers 1702 and 1704 also denote the major code associated with the stack unwind.

With reference now to FIGS. 18A–18B, tables depict major codes and minor codes that may be employed to instrument software modules for profiling. In order to facilitate the merging of event-based profiling information and sample-based profiling information, a set of codes may be used to turn on and off various types of profiling functions.

For example, as shown in FIGS. 18A–18B, the minor code for a stack unwind is designated as 0×7 ffffff, which may be used for two different purposes. The first purpose, denoted with a major code of 0×40, is for a stack unwind during a timer interrupt. When this information is output into a trace file, the stack information that appears within the file will have been coded so that the stack information is analyzed as sample-based profiling information. The second purpose, denoted with a major code of 0×41, is for a stack unwind in an instrumented routine. This stack information could then be post-processed as event-based profiling information.

Other examples in the table show a profile or major code purpose of tracing jitted methods with a major code value of 0×50. Tracing of jitted methods may be distinguished based on the minor code that indicates method invocation or method exit. In contrast, a major code of 0×30 indicates a profiling purpose of instrumenting interpreted methods, while the minor code again indicates, with the same values, method invocation or method exit.

Referring back to FIG. 17, the connection can be made between the use of major and minor codes, the instrumentation of code, and the post-processing of profile information. In the generated report shown in FIG. 17, the stack unwind identifiers can be seen to be equal to 0×40, which, according to the tables in FIGS. 18A–18B, is a stack unwind generated in response to a timer interrupt. This type of stack unwind may have occurred in response to a regular interrupt that was created in order to generate a sampled profile of the executing software.

As noted in the last column of the tables in FIGS. 18A–18B, by using a utility that places a hook into a software module to be profiled, a stack unwind may be instrumented into a routine. If so, the output for this type of stack unwind will be designated with a major code of 0×41.

As stated previously, the attempt to determine execution flows within an application program causes side-effects and distortions in the profiling information to be recorded. The types of side-effects depend upon the manner in which the profiling is accomplished. One effect that may be measured is the overhead associated with the execution of instrumentation code within the execution flows of the application program. As the application program executes, the instrumentation may incur significant overhead in the form of calls to obtain system information, such as a call to obtain a current timestamp, and compensation may be made for some types of overhead in certain situations.

In addition to unwanted effects that may occur to the system by the profiling processes, another hazard in profiling a program lies in the reverse—unwanted effects may be caused by the system to the information that the profiling processes are attempting to capture. Since most computer systems are interruptable, multi-tasking systems, the operating system may perform certain actions underneath the profiling processes, unbeknownst to the profiling processes. The most prevalent of these actions is a thread-switch. While a profiling process is attempting to capture information about the occurrence of an event within a particular thread, the system may perform a thread switch. Once the profiling process obtains the desired information for recording, the information may have changed due to the thread switch.

An important datum concerning the occurrence of an event is its time of occurrence. However, during the retrieval of the time of an event, a thread switch may occur, and the recorded time may not accurately reflect the actual time that the event occurred. In order to prevent thread switches from distorting the recordation of the passage of time between events during a profiling session of a program, a thread-relative time may be computed and used as a time value during the recordation of events. This concept may be generalized so that any increasing metric, such as a number of page faults or a number of events gathered from performance counters, may be employed in place of time or in addition to time. Various types of information may be recorded during a profiling session, and each of these types of information may be referred to as a "metric", i.e. a value to be metered or measured or that is involved in measurements. These metrics are usually associated with a system resource of interest, such as the number of I/O actions as discussed with respect to FIG. 10C, the number of bytecodes executed in a method as discussed with respect to FIG. 11B, the amount of memory allocated, the amount of time elapsed, the number of cache misses, etc. Rather than, or in addition to, computing and storing a thread-relative elapsed time, a profiling process may compute and store a thread-relative elapsed metric, or more simply, a thread-relative metric.

The present invention is directed to maintaining and using a plurality of metrics during a profiling process, and in particular, to maintaining and using a plurality of thread-relative metrics.

For example, a hardware system analyst may desire to know the number of instructions that were completed and the number of cache misses during the same period of time or during a period of hardware clock cycles. In a similar manner, it would be helpful for a software system analyst to have a frame of reference consisting of the tracking of multiple types of software events, possibly during the same period of time during which the hardware events occurred. Software-related events might include the number of memory allocations, the number of bytes allocated, the number of memory deallocations, the number of bytes deallocated, the number of bytes interpreted, the number of methods jitted, etc.

When referenced together as a unit, a set of metrics may be termed a "vector of metrics". At any point in the processing of metric information, each metric in the vector of metrics may be individually obtained and processed in a series, as will be described in more detail further below.

With reference now to FIG. 19A, a flowchart depicts a summary of the manner in which elapsed time is attributed to various routines in an execution flow. As noted previously, profiling events are generally processed and stored into a trace buffer in real-time, and at some subsequent time, the trace buffer is written to a trace file. The trace buffer may contain trace records, but at a minimum, the trace buffer should contain, for each event that has been recorded, an indication of the event location within the program that is being profiled. In addition, as noted above, the time at which an event occurred is also an important datum, and time information relating the time of the occurrence of the event should be stored in association with the event information. FIG. 19A is merely a summary of previously described processes concerning how timestamps relate to events and how time flow is attributed among routines within execution flows.

The process begins with the retrieval of the previous event time that was saved during the previous request for a timestamp, which may have occurred during the trace of the previous event (step 1902). The last time increment, or delta event time, is computed as the difference between the current event time and the previous event time (step 1904). The delta event time is then attributed to one of the routines associated with the occurrence of the event, e.g., the routine which is being entered during the event or the routine which is being exited during the event (step 1906). The process is then complete with respect to obtaining a time increment from a current trace event and determining the routine to which the time increment should be attributed.

With reference now to FIG. 19B, a timeline depicts demarcated time points with which the process in FIG. 19A is concerned. The previous event time is the timepoint at which a previous event has occurred, such as an entry event or an exit event. Alternatively, this timepoint is the time at which a timestamp was previously requested. The current event time is the timepoint at which the subsequent event has been recorded to occur, such as the next entry event or exit event. Alternatively, this timepoint is the time at which a timestamp is currently being requested. The difference between the previous event time and the current event time is shown as the delta event time, also described as the last time increment.

Figure 20A:
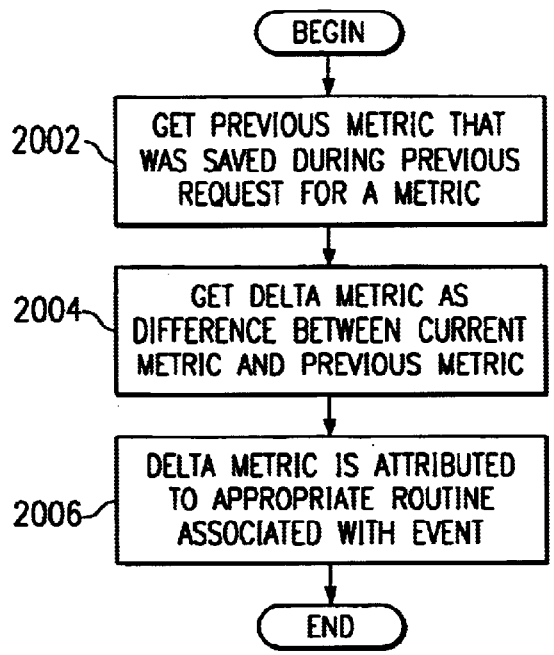
FIG. 20A is a flowchart depicting a summary of the manner in which a metric is attributed to various routines in an execution flow.

With reference now to FIG. 20A, a flowchart depicts a summary of the manner in which a metric is attributed to various routines in an execution flow. FIG. 20A is similar to FIG. 19A except that a generic metric is computed rather than time.

The process begins with the retrieval of the previous reference metric that was saved during the previous request for a metric, which may have occurred during the trace of the previous event (step 2002). A "reference metric" is a metric whose measurement value or count value was commenced at a particular point in time, such as the initialization of the currently executing program or the initialization of the computer platform on which the profiling process is being performed. Hence, the reference metric represents an uninterrupted, increasing value of the metric of interest, i.e. the running total value of a metric that has elapsed since some prior event or point in time.

The delta metric is computed as the difference between the current reference metric and the previous reference metric (step 2004). The "delta metric" is a metric whose measurement value or count value commenced at a particular event and stopped at another event. Hence, the delta metric represents a value of a metric during a particular period of time.

During the profiling phase of the trace of a program, the current reference metric may be retrieved, for example, by making a system call to determine a measurement value associated with a system resource. In other words, it is assumed that the system maintains a running total measurement or total count related to a system resource of interest, such as a total number of memory allocations. These reference metric values may be processed into a call stack tree representation in real-time during the profiling phase or may be processed after the profiling phase during post-processing of the trace records, at which time the call stack tree representation may be created.

The delta metric is then attributed to one of the routines associated with the occurrence of the event, e.g., the routine which is being entered during the event or the routine which is being exited during the event (step 2006). The process is then complete with respect to obtaining a metric for a current trace event and determining the routine to which the metric should be attributed.

Figure 20B:
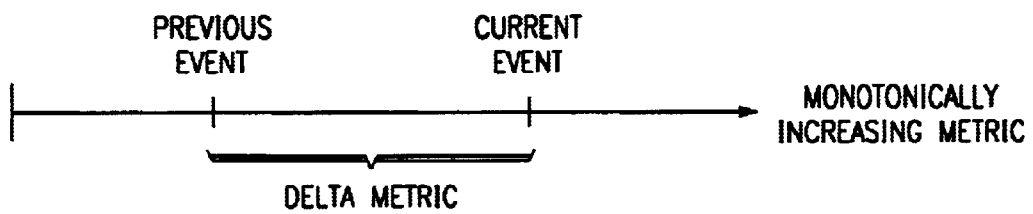
FIG. 20B is a dimensional line depicting demarcated points along a dimension associated with a resource of interest or metrics of interest with which the process in FIG. 20A is concerned.

With reference now to FIG. 20B, a dimensional line depicts demarcated points along a dimension associated with a resource of interest or metrics of interest with which the process in FIG. 20A is concerned. A generic metric is assumed to be monotonically increasing over time. The previous event is the point at which a previous event has occurred, such as an entry event or an exit event. Alternatively, this point represents the point at which a reference metric was requested. The current event is the point at which the subsequent event has been recorded to occur, such as the next entry event or exit event. Alternatively, this point represents the point at which a reference metric is currently being requested. The difference in the metrics between the previous event and the current event is shown as the delta metric.

The process described in FIG. 20A may encounter several problems in a multithreaded environment. If there are multiple undetected thread switches between the previous event and the current event, then the delta metric will be incorrectly determined and possibly incorrectly applied to a method in an unassociated thread. Because the instrumentation code may not be able to detect the occurrence of a thread switch, it may also not be able to determine when an actual thread switch happened. Therefore, in order to account for metrics in an accurate manner, the present invention provides a mechanism for maintaining thread-relative metrics for trace data using support from a device driver or kernel routine.

Figure 21:
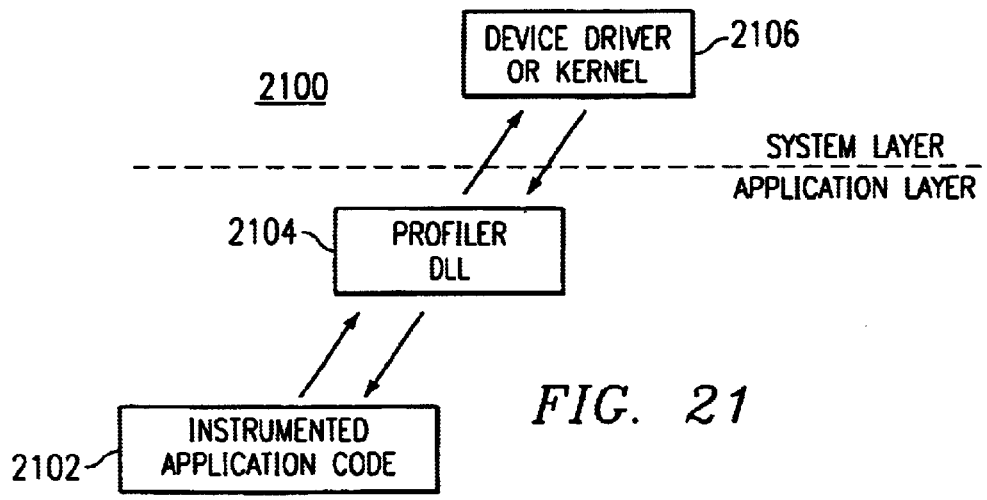
FIG. 21 is a block diagram depicting an organization of system components for obtaining an accurate metrictime handling in a multithreaded environment.

With reference now to FIG. 21, a block diagram depicts an organization of system components for obtaining an accurate metric in a multithreaded environment. System 2100 contains instrumented application code 2102 that, upon the occurrence of selected events, invoke methods or routines within profiling code, such as profiler dynamic link library (DLL) 2104. Profiler 2104 may contain the functionality necessary for generating trace records that are output to a trace buffer. Profiler 2104 may request and receive certain types of system information from device driver or kernel 2106. The device driver may keep thread-relative information, such as thread-relative metrics, in a variety of data structures, such as trees, linked lists, hash tables, etc. As a thread is dispatched, a node may be created for a newly dispatched thread, and when the thread terminates, the node may be either deleted or kept in memory for diagnostic or profiling purposes. This information may include a thread-relative metric to be subsequently used as a base metric to be attributed to a routine or module executing within instrumented application code 2102.

Figure 22:
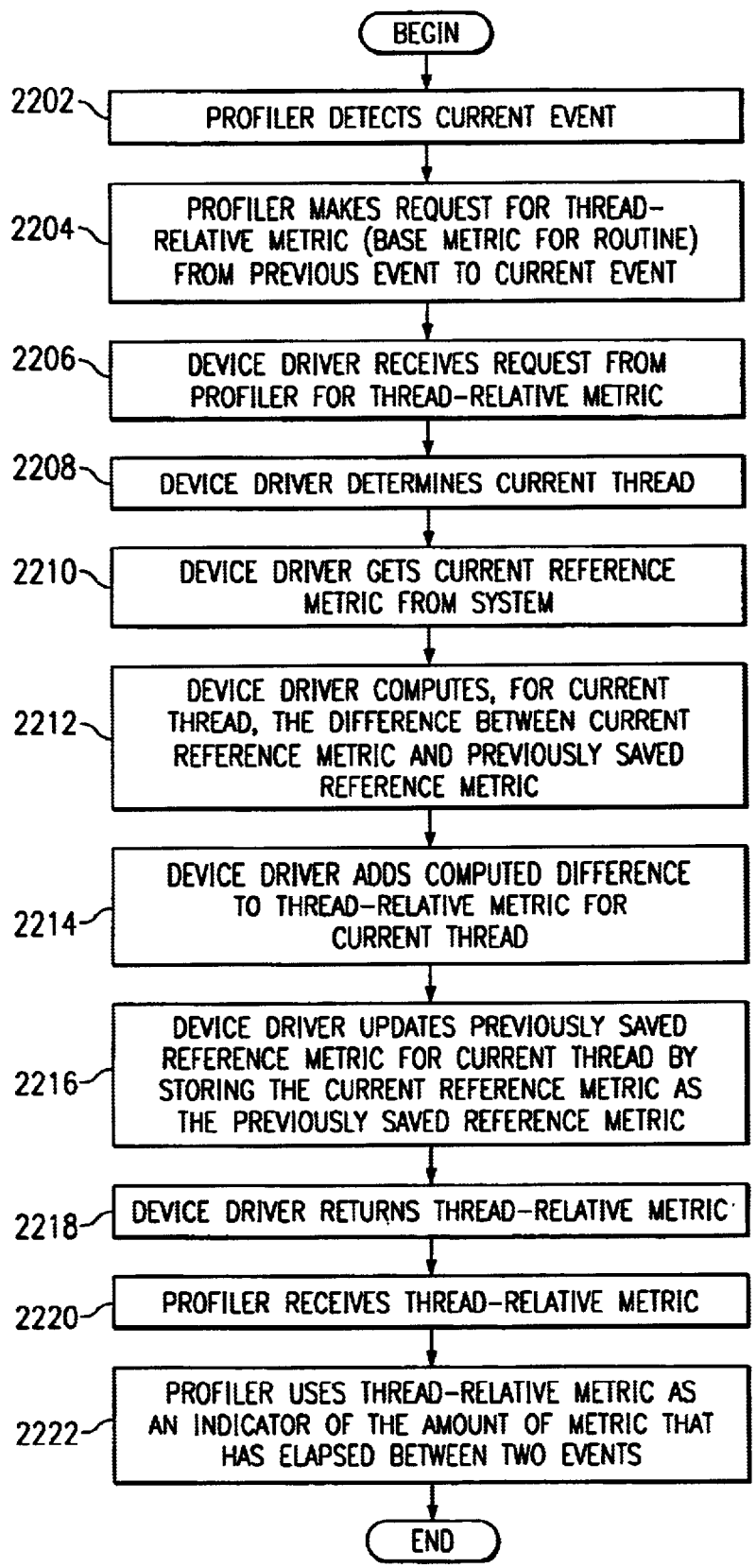
FIG. 22 is a flowchart depicting a process for obtaining a delta metricevent time value for determining a thread-relative metricelapsed time between events.

With reference now to FIG. 22, a flowchart depicts a process for obtaining a delta metric value for determining a thread-relative metric between events. The process begins when the profiler detects a current event (step 2202). The profiler then makes a request for the thread-relative metric, i.e. the metric from the previous event to the current event within the current thread (step 2204).

A device driver or kernel routine receives the request from the profiler for the thread-relative metric (step 2206). The device driver determines the currently executing thread (step 2208) and gets the current reference metric from the system (step 2210). The device driver then computes the difference, for the current thread, between the current reference metric and the previously saved reference metric (step 2212). The device driver then adds the computed difference to the thread-relative metric for the current thread (step 2214) and updates the previously saved reference metric for the current thread by storing the current reference metric as the previously saved reference metric, thereby maintaining an elapsed reference metric at the point in time at which the thread-relative metric was last updated (step 2216). By saving this elapsed reference metric, the thread-relative metric may be updated during the next request for the thread-relative metric.

The device driver then returns the thread-relative metric (step 2218), and the profiler receives the thread-relative metric (step 2220). The profiler then uses the thread-relative metric as an indicator of the amount of metric that has elapsed between two events (step 2222). For example, a post-processor may then use the recorded thread-relative metrics in a trace file to attribute various execution-related metrics to modules or routines. The process is then complete with respect to obtaining a thread-relative metric from the device driver.

With reference now to FIG. 23, a flowchart depicts a process by which the device driver maintains metric information concerning various instrumented events that may occur between thread switches. The process begins when the device driver is notified of a thread switch from a previous thread to a current thread (step 2302). The device driver then gets the current reference metric from the system (step 2304). The device driver computes the difference between the current reference metric and the previous reference metric for the previous thread (step 2306). The computed difference is then added to the thread-relative metric for the previous thread (step 2308).

The current reference metric is then saved in the thread control block of the current thread as the previously saved reference metric for the previous thread (step 2310). This saves a value for the reference metric at the point in time at which the thread-relative elapsed metric was last updated. The current reference metric is then saved in the thread control block of the current thread as the previously-saved reference metric for the current thread (step 2312). This provides a value for the reference metric at the point in time at which the thread was reactivated or dispatched in order to compute subsequent comparisons and computations for the metric when requested. The process is then complete with respect to thread switch processing within the device driver.

With reference now to FIG. 24, a set of timelines depict some of the actions performed by the device driver with respect to a thread switch between two different threads. Thread-relative metric line 2402 depicts the processing with respect to thread A, and thread-relative metric line 2404 depicts some of the processing with respect to thread B. Previous event 2406 demarcates the point at which a previous event was recorded to have occurred. At that time, an amount of delta metric began to accumulate between events within thread A. Also at that time, thread B is a dormant thread with two saved values: a previous reference metric for thread B; and a thread-relative metric for thread B.

At point 2408, a thread switch occurs between thread A and thread B. When notified of the thread switch, the device driver computes the thread-relative metric for thread A and saves it for subsequent processing. The device driver also sets the previous reference metric for thread A to the current reference metric, i.e. the value of the metric at the point at which the thread switch occurs. With respect to thread B, the device driver must update the previous reference metric. At point 2408, an amount of delta metric begins to accumulate between events within thread B.

At the end of a trace run, all elapsed metrics from the kernel may be applied to all threads processed by the profiler (or the post-processor), and the values of the metrics in threads not known to the profile may be identified for total system analysis. In this manner, remaining metric values within the kernel or device driver are output for analysis rather than being discarded.

Various methods may be used to track thread-relative metrics. For example, all events may be sent to a kernel device driver that is responsible for handling the necessary metric functionality associated with tracing the events. The device driver may patch the operating systems' thread dispatch code to receive control over such functions. The device driver may also patch the operating system's interrupt code in order to receive control over certain interrupts, e.g., interrupts associated with real-time sampling. The:device driver may also receive entry trace hooks and exit trace hooks from a Java Virtual Machine Profiling Interface (JVMPI).

As another example of the manner in which the computing environment may support the maintenance of thread-relative metrics, the JVMPI code or the profiler DLL may obtain the current metric from the system when an event occurs and then generate a request to the device driver to trace the necessary information. In this case, the device driver receives the request, which contains the current reference metric obtained by the profiler, the thread ID of the thread which caused the event, i.e. which caused the profiler to begin event processing, and any other necessary information for tracing the event, such as a program location which caused the event or method name which caused the event. However, since the profiler obtains the current reference metric, a potential problem could exist in that the operating system may switch to a different thread during the period of time between the occurrence of the event and the time at which the trace processing for the event is completed.

However, one may properly account for any potential mismatching of threads and occurrences of events which could potentially occur during thread switches by monitoring the metric values received in a request from the profiling code and the metric values that are maintained by a device driver or kernel. Using the fact that the metric must be a monotonically increasing measurement, if it is determined that the previous reference metric saved/maintained by the device driver is less than the current reference metric in the request obtained by the profiler code, then it is assumed that a thread switch has not occurred between the point at which the current event has occurred and the point at which the previous reference metric was updated or saved. This should be intuitively obvious as the current metric should always be interpreted as occurring at a point in time later than the previous event, and hence, the metric could only have increased during the period of time between the two events.

If it is determined that the previous reference metric saved/maintained by the device driver is not less than the current reference metric in the request, then it is assumed that a thread switch has occurred between the point at which the current event occurred and the point at which the previous reference metric was updated or saved. This should be intuitively obvious as the current event should always occur at a time later than the previous event time, and hence, the metric saved from the previous event could not be greater than the metric within the request as the metric could not have decreased during the period of time between the two events.

The description provided above with respect to FIGS. 19A–24 describes a variety of methods for obtaining a thread-relative metric. As noted previously, it is sometimes advantageous to process a plurality of thread-relative metrics as a set, a so-called vector of metrics. At each point that a profiling process may maintain or use a single metric, a vector of metrics may be maintained or used. The following description explains the processes that support and extend the use of a single metric into a vector of metrics.

It is assumed that the user has the opportunity to specify operational parameters for the applications through an appropriate manner, such as through a command line interface using a parameter specification similar to "run program arg1 arg2". Alternatively, some other type of user interface, such as a graphical user interface, may be used to accept user preferences and user parameters. These types of operational parameters may also be stored in environment variables, configuration files, application resource files, Java property files, etc.

With reference now to FIG. 25, an example of an input command for a vector of metrics is provided in accordance with a preferred embodiment of the present invention. In order to input parameters for a vector of metrics to be used by a trace utility or profiler, the user may be allowed to specify the particular metrics to be measured, including an option for an identification of a primary metric. For example, the user may input a command similar to that shown in command line 2502. Zero or more metrics may be supported. The number of metrics supported by the profiler may vary, and the content or interpretation of each metric may also vary. A user may be allowed to specify all of the supported metrics or only a subset of all metrics. The profiler stores these user-selected metrics for subsequent use for obtaining event-related information. The selected metrics may be stored in a table, array, etc., for subsequent retrieval at the appropriate time.

One or more metrics may be understood to be default metrics that appear as default information in a trace, e.g., "time" may be a default metric. Alternatively, if no metrics are specified, the trace may contain no metric information. In this case, the call stack tree representation would not contain any metric information, i.e. any statistics related to the execution of the program. Assuming that the profile information contains the names of the routines that caused the events that are being recorded, the call stack tree would merely represent the execution flows between the modules or routines represented by the nodes of the call stack tree.

Figure 26:
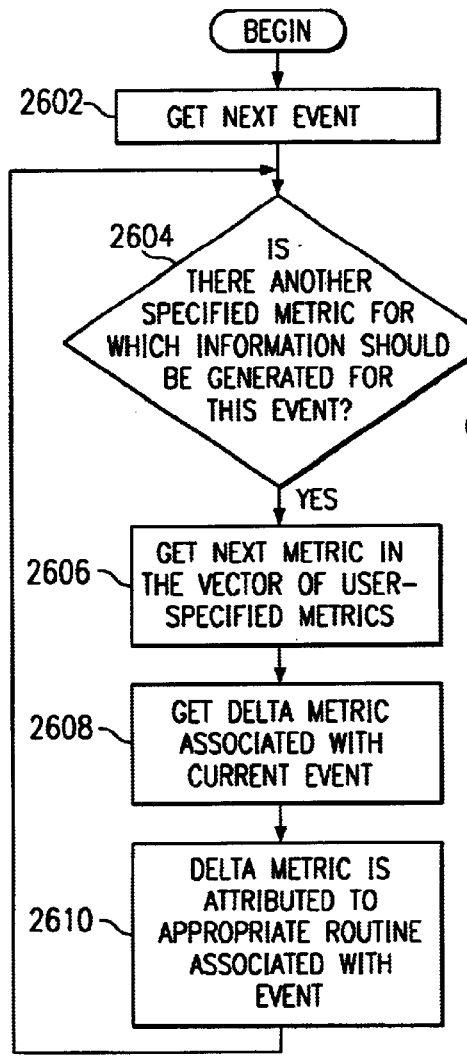
FIG. 26 is a flowchart depicting the manner in which a vector of metrics may be used rather than a single metric during profile-related processes.

With reference now to FIG. 26, a flowchart depicts the manner in which a vector of metrics may be used rather than a single metric during profile-related processes. The process begins when an event occurs during a program being profiled, if real-time processing is performed, or when an event record is retrieved, if post-processing is being performed (step 2602). A determination is then made as to whether there is a metric to be output as previously selected or specified by a user (step 2604). If not, then the process is complete for this particular event.

If there is another specified metric for which information should be output for this event, then the process is similar to the process previously described with respect to FIG. 20A. The next metric in the vector of user-specified metrics is retrieved (step 2606), and the delta metric associated with the current event is obtained or computed (step 2608). The delta metric is attributed to the appropriate routine associated with the event (step 2610), and the process loops to step 2604 to check whether another metric should be generated. In this manner, multiple metrics in a vector of metrics may be generated or obtained at any point at which a single metric could be obtained or computed.

Figure 27A:
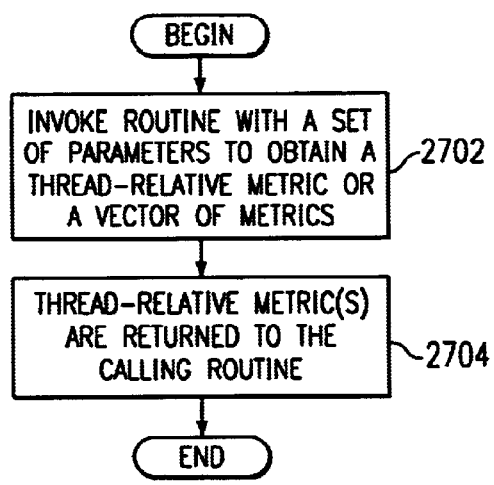
FIG. 27A is a flowchart depicting a process by which an application programming interface is used to retrieve thread-relative metric values.

With reference now to FIG. 27A, a flowchart depicts a process by which an application programming interface is used to retrieve thread-relative metric values. Whereas FIG. 26 depicts a process for allowing a user to set parameters to control the computation of a metric, FIG. 27A depicts a process for allowing a user to retrieve metric values. The process begins with the program invoking a routine with a set of parameters in order to obtain a thread-relative metric (step 2702). The parameters may include a process ID, a thread ID (a so-called "pidtid"), and a reference or pointer to which the thread-relative metric information should be returned. Depending upon the implementation of the API, the routine may return a single metric or multiple metrics as previously specified in a vector of metrics. Upon completion of their computation or derivation, the thread-relative metrics are returned to the calling routine (step 2704). This API provides a programmatic means that allows a program to have direct access to the thread-relative metrics that are computed and stored, e.g. by the profiling code, a device driver, or the kernel, during the profiling phase of the trace.

With reference now to FIG. 27B, an example of an application programming interface for retrieving a vector of metrics is shown. In API 2750, a method named "GetMetricVector" is invoked with parameters for a pidtid, a pointer to a location at which the vector of metrics should be returned, and a set of flags that allow a programmer to specify individually and selectively which metrics in the vector of metrics should be retrieved. Alternatively, the API may be written such that a flag parameter is not required, or it may be written such that all metrics in the vector of metrics are retrieved by default unless specified otherwise.

Figure 28A:
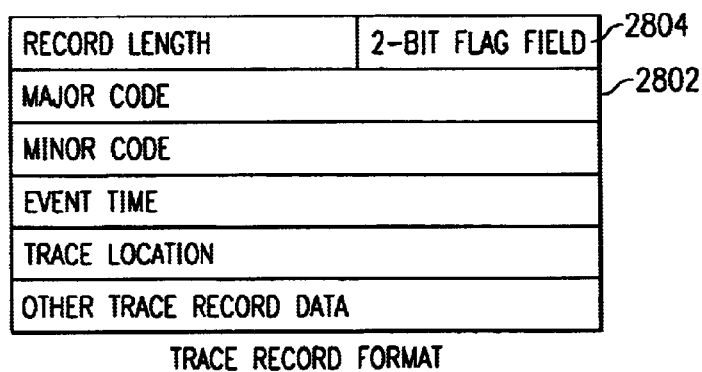
FIGS. 28A–28B depict trace record formats.
Figure 28B:
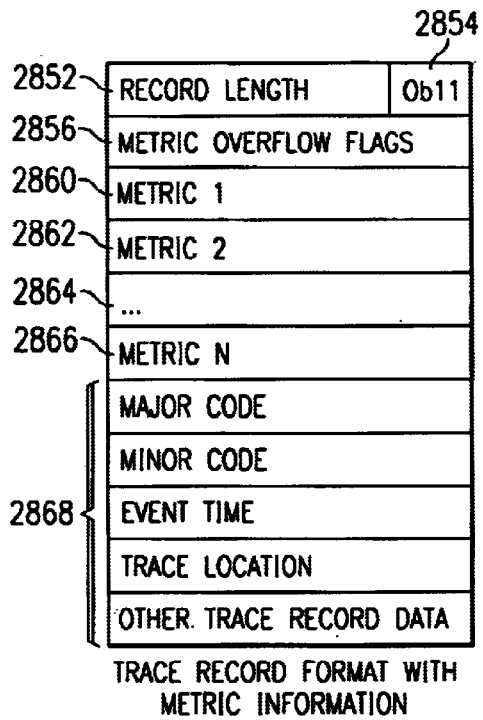

With reference now to FIGS. 28A–28B, trace record formats are depicted. In FIG. 28A, Trace record 2802 contains various fields, such as record length, major code, minor code, event time, trace location, and other trace record data. Trace record 2802 may be generated by a profiler routine at the application level or at the system level, such as by a routine within a device driver or a routine within the kernel or a kernel extension.

The trace records are preferably written to a pinned buffer for a variety of reasons. For example, by placing the trace records in a pinned buffer, the system does not swap out the memory containing the trace records; otherwise, the timestamp that is recorded within the event record would capture the execution time required for the data to be rolled back into memory in addition to the execution time for processing the event. Another example in which a pinned buffer may be useful is for events that are placed in sensitive areas, e.g. system dispatch logic—a pinned buffer might be used because it may be unsafe for a page fault to occur during the execution of such code.

Alternatively, the trace records may be written by a specialized piece of hardware which accepts data and provides its own timestamps. This hardware, or trace card, could be implemented as a PCI card. With this approach, the system can send the type of trace record and the trace record data to the card, and the card generates the trace record including the timestamps and relevant control information. The event time and the various other metrics within the processes of the present invention can be any monotonically increasing measure, such as cycles, cache misses, microseconds, milliseconds, etc.

Flag field 2804 is a two-bit flag field that indicates an adjustable format for the record content. Because a trace record may be rounded to a particular size, a few bits at the end of the record length may always be zero. For example, if the record length is rounded (with zero-padding if necessary) to word locations, i.e. 4-byte memory boundaries, then two bits would always be zero, and these bits may be used as formatting flags. For example, binary "00" may indicate fixed 32-bit fields only; binary "01" may indicate variable length fields only; binary "10" may indicate both fixed and variable length fields; and binary "11" may indicate that the record contains metrics.

In FIG. 28B, trace record 2852 represents a trace record with metric information. Flag field 2854 indicates that the trace record contains metric information. The inclusion of metric information in the trace records may be optional as indicated by flag field 2854. Other fields similar to the fields in FIG. 28A may also be placed into the trace records.

Field 2856 contains metric overflow flags, and fields 2860–2866 provide the actual metrics, such as a previously specified vector of metrics. Trace metrics may be maintained as 64-bit values. However, for most post-processing requirements, only changes in a metric are needed from one trace record to another. In other words, the absolute value of a metric is needed at the start of the trace, but subsequent absolute values in every trace record would not be required, only the deltas from the starting value. In order to reduce the amount of data in the trace records, only the lower 32 bits of a metric value could be written into a trace record, with an indicator of whether a metric has overflowed or wrapped, such as overflow flag field 2856. A module that processes the trace record may then use an overflow flag to interpret the value of a metric. If more than one level of wrap has occurred, then another set of flags may be included to indicate a metric that has wrapped more than once and another set of bits may indicate the wrap value. In this manner, significant amounts of storage for the metric information may be saved because a typical trace may generate many thousands of records.

As a preferred alternative to reducing the amount of metric information during a trace, separate trace records are generated that indicate the format of all subsequent trace records containing metric information. In other words, the previous method described above includes, in a each trace record with an indication of inclusion of metric information, a flag field that indicates which metrics are included in the trace record. Instead, a separate trace record, termed a metric indicator trace record, may be generated at each point at which the type of generated metric information is changed. As the output records are processed, either in real-time or in a post-processing phase, these metric indicator trace records are used to indicate which metrics are included in the following trace records until another metric indicator trace record is encountered.

Figure 28D:
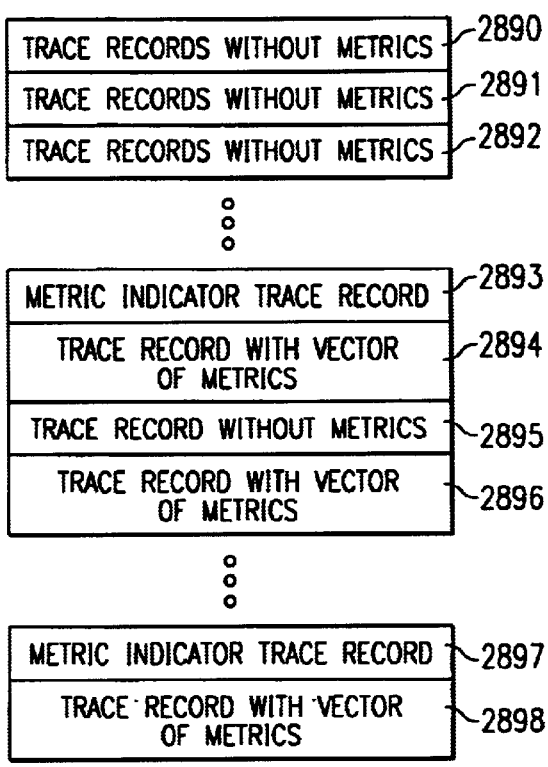
FIG. 28D is a diagram depicting an example of a set of trace records that may be output to indicate metric information in accordance with a preferred embodiment of the present invention.
Figure 28C:
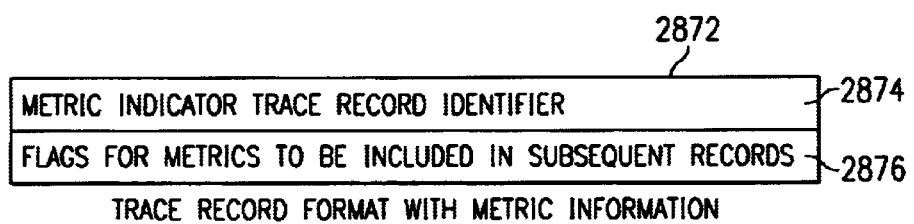
FIG. 28C depicts a record format for a metric indicator trace record.

With reference now to FIG. 28C, a record format for a metric indicator trace record is shown. Metric indicator trace record 2872 contains a special identification code 2874 for identifying the trace record amongst other types of trace records. Flags field 2876 contains flags for identifying the metrics that appear in subsequent trace records. The order of the metrics within a subsequent trace record may be associated with the order of the metric flags within the flags field. In this manner, the output from a vector of metrics may be changed on-the-fly during the profiling phase of a trace.

With reference now to FIG. 28D, a diagram depicts an example of a set of trace records that may be output to indicate metric information in accordance with a preferred embodiment of the present invention. Trace records 2890–2898 represent a series of trace records that are generated during a profiling phase of a trace. Trace records 2890–2892 are trace records without metrics. After metric indicator trace record 2893 is generated, subsequent trace records which contain metric information, such as 2894 and 2896, are interpreted using the metrics that were identified in metric indicator trace record 2893. It should be noted that not all trace records include metric information. Metric indicator trace record 2897 represents another trace record indicating a different set of metrics, and trace record 2898 would contain metric information that would be interpreted using the metrics identified in metric indicator trace record 2897.

By using metric indicator trace records, significant amounts of storage for the metric information may be saved during a typical trace of many thousands of records. Another advantage is that before profiling startup is complete or before the program being profiled has finished its initialization, metric information may not be needed within the trace records. For example, during startup, it may only be necessary to generate trace records which identify the loaded modules, and metric information may not be useful during this period. Just prior to the completion of startup, trace records containing all metric information for a previously specified vector of metrics may be generated, thereby providing a base of value for the vector of metrics. The format of the trace records containing metric information may be changed by writing a single metric indicator trace record. When it is desired to change the set of metrics whose values are being placed into the trace records, another metric indicator trace record may be written.

If trace records are written with dispatch hooks, at thread dispatch time, then the current value of the metrics in the vector of metrics may be recorded. During post-processing, the post-processor may apply a delta metric against the full metric value at dispatch time by using the changes of the values of the metrics written into the trace records between the start and the end of each thread dispatch.

When the metrics are recorded at each dispatch, it is reasonable to assume that no more than a single wrap has occurred. Thus, determining whether a metric has wrapped can be detected during post-processing, and in this situation, there is no need to write special trace records or flags to indicate the wrap of one or more metrics. However, for post-processing efficiency and for other cases where the metric data either is not recorded at each dispatch or the metric increases too rapidly, the metric wrapping information would be required.

While the majority of the detailed description above concerned a vector of thread-relative metrics, the concept of a vector of metrics may be generalized to instances of sets of metrics which are not thread-relative. In other words, a vector of metrics may be computed, maintained, and used in which the profiling code, either real-time code or post-processing code, does not concern itself with thread switches. This type of situation is actually much easier to handle programmatically because the profiling code does not need to maintain separate metrics for each thread, and the vector of metrics may be maintained at either kernel or device driver level or the application level.

The advantages of the present invention are apparent in view of the detailed description of the invention provided above. Thread-relative metrics are optionally maintained. A user has the ability to specify a vector of metrics through a user-interface. The values for the metrics in the vector of metrics may be accessed programmatically through an API, and the manner in which the vector of metrics is output during a trace may be dynamically changed. The functionality associated with a vector of metrics allows an analyst to have a frame of reference consisting of the tracking of multiple types of information associated with hardware and software events.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for processing events detected while profiling an instrumented program in a data processing system, the method comprising the computer-implemented steps of:

receiving a metric indicator trace record containing a set of flags that identify metrics to be generated;

detecting a current event;

in response to the current event, computing a vector of metrics since a preceding event, wherein the vector of metrics includes metrics identified in the metric indicator trace record;

storing the vector of metrics; and generating overflow flags indicating metrics that have overflowed a predetermined numeric data type during a time period between the previous event and the current event.

2. The method of claim 1 further comprising:

in response to the current event, generating a request for a vector of metrics since a preceding event.

3. The method of claim 1 further comprising:

invoking an application programming interface to retrieve a vector of metrics.

4. The method of claim 1 further comprising:

allowing a user to specify a plurality of metrics as a vector of metrics to be generated during a profiling phase of the instrumented program.

5. The method of claim 1 further comprising:

outputting trace records during execution of a profiling process in the data processing system.

6. The method of claim 1 further comprising:

generating a trace record for the current event, wherein the trace record comprises values equal to the computed vector of metrics.

7. The method of claim 1 further comprising:

generating a metric indicator trace record containing a set of flags to identify metrics to be generated in subsequently generated trace records.

8. The method of claim 1 further comprising, for each specified metric in the vector of metrics:

retrieving a stored reference metric for the preceding event, wherein the specified metric is associated with the reference metric;

obtaining a current reference metric; and computing the specified metric in the vector of metrics as a difference between the current reference metric and the stored reference metric.

9. The method of claim 1 wherein the vector of metrics is a vector of thread-relative metrics.

10. The method of claim 9 further comprising, for each specified metric in the thread-relative vector of metrics:

determining a current thread;

retrieving a stored reference metric for the preceding event of a current thread, wherein the specified metric is associated with the reference metric;

obtaining a current reference metric; and computing the thread-relative metric as a difference between the current reference metric and the stored reference metric.

11. A data processing system for processing events detected while profiling an instrumented program in the data processing system, the data processing system comprising:

receipt means for receiving a metric indicator trace record containing a set of flags that identify metrics to be generated;

detecting means for detecting a current event;

first computing means for computing, in response to the current event, a vector of metrics since a preceding event, wherein the vector of metrics includes metrics identified in the metric indicator trace record;

storing means for storing the vector of metrics; and fourth generating means for generating overflow flags indicating metrics that have overflowed a predetermined numeric data type during a time period between the previous event and the current event.

12. The data processing system of claim 11 further comprising:
first generating means for generating, in response to the current event, a request for a vector of metrics since a preceding event.

13. The data processing system of claim 11 further comprising:
invoking means for invoking an application programming interface to retrieve a vector of metrics.

14. The data processing system of claim 11 further comprising:
allowing means for allowing a user to specify a plurality of metrics as a vector of metrics to be generated during a profiling phase of the instrumented program.

15. The data processing system of claim 11 further comprising;
outputting means for outputting trace records during execution of a profiling process in the data processing system.

16. The data processing system of claim 11 further comprising:
second generating means for generating a trace record for the current event, wherein the trace record comprises values equal to the computed vector of metrics.

17. The data processing system of claim 11 further comprising:
third generating means for generating a metric indicator trace record containing a set of flags to identify metrics to be generated in subsequently generated trace records.

18. The data processing system of claim 11 further comprising, for each specified metric in the vector of metrics:
first retrieving means for retrieving a stored reference metric for the preceding event, wherein the specified metric is associated with the reference metric;
first obtaining means for obtaining a current reference metric; and
second computing means for computing the specified metric in the vector of metrics as a difference between the current reference metric and die stored reference metric.

19. The data processing system of claim 11 wherein vector of metrics is a vector of thread-relative metrics.

20. The data processing system of claim 19 further comprising, for each specified metric in the thread-relative vector of metrics:
determining means for determining a current thread;
second retrieving means for retrieving a stored reference metric for the preceding event of a current thread, wherein the specified metric is associated with the reference metric;
second obtaining means for obtaining a current reference metric; and
third computing means for computing the thread-relative metric as a difference between the current reference metric and the stored reference metric.

21. A computer program product in a computer-readable medium for use in a data processing system for processing events detected while profiling an instrumented program, the computer program product comprising:
first instructions for receiving a metric indicator trace record containing a set of flags that identify metrics to be generated;
second instructions for detecting a current event;
third instructions for in response to the current event, computing a vector of metrics since a preceding event, wherein the vector of metrics includes metrics identified in the metric indicator trace record;
fourth instructions for storing the vector of metrics; and
fifth instructions for generating overflow flags indicating metrics that have overflowed a predetermined numeric data type during a time period between the previous event and the current event.

22. The computer program product of claim 21 further comprising:
instructions for generating, in response to the current event, a request for a vector of metrics since a preceding event.

23. The computer program product of claim 21 further comprising:
instructions for invoking an application programming interface to retrieve a vector of metrics.

24. The computer program product of claim 21 further comprising:
instructions for allowing a user to specify a plurality of metrics as a vector of metrics to be generated during a profiling phase of the instrumented program.

25. The computer program product of claim 21 further comprising:
instructions for outputting trace records during execution of a profiling process in the data processing system.

26. The computer program product of claim 21 further comprising:
instructions for generating a trace record for the current event, wherein the trace record comprises values equal to the computed vector of metrics.

27. The computer program product of claim 21 further comprising:
instructions for generating a metric indicator trace record containing a set of flags to identify metrics to be generated in subsequently generated trace records.

28. The computer program product of claim 21 further comprising, for each specified metric in the vector of metrics:
instructions for retrieving a stored reference metric for the preceding event, wherein the specified metric is associated with the reference metric;
instructions for obtaining a current reference metric; and
instructions for computing the specified metric in the vector of metrics as a difference between the current reference metric and the stored reference metric.

29. The computer program product of claim 21 wherein the vector of metrics is a vector of thread-relative metrics.

30. The computer program product of claim 29 further comprising, for each specified metric in the thread-relative vector of metrics:
instructions for determining a current thread;
instructions for retrieving a stored reference metric for the preceding event of a current thread, wherein the specified metric is associated with the reference metric;
instructions for obtaining a current reference metric; and
instructions for computing the thread-relative metric as a difference between the current reference metric and the stored reference metric.

* * * * *